United States Patent
Kubo et al.

(10) Patent No.: US 7,178,393 B2
(45) Date of Patent: Feb. 20, 2007

(54) MEASURING APPARATUS AND METHOD FOR THIN BOARD

(75) Inventors: Keishi Kubo, Moriguchi (JP); Masateru Doi, Hirakata (JP); Naofumi Hino, Hirakata (JP); Hiroyuki Mochizuki, Katano (JP); Syojiro Satake, Daito (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 127 days.

(21) Appl. No.: 10/973,349

(22) Filed: Oct. 27, 2004

(65) Prior Publication Data
US 2005/0223791 A1 Oct. 13, 2005

(30) Foreign Application Priority Data
Oct. 30, 2003 (JP) ............................. 2003-370411
Oct. 22, 2004 (JP) ............................. 2004-308380

(51) Int. Cl.
*G01L 5/04* (2006.01)
(52) U.S. Cl. ............................................. 73/159
(58) Field of Classification Search .................. 73/104, 73/105, 150, 159
See application file for complete search history.

(56) References Cited

U.S. PATENT DOCUMENTS

| 4,280,354 A | | 7/1981 | Wheeler et al. | |
|---|---|---|---|---|
| 5,872,408 A | * | 2/1999 | Rakov | 310/68 B |
| 6,132,289 A | * | 10/2000 | Labunsky et al. | 451/6 |
| 6,849,152 B2 | * | 2/2005 | Tang | 156/345.25 |
| 6,882,413 B2 | * | 4/2005 | Bowman | 356/237.2 |
| 7,034,563 B1 | * | 4/2006 | Souchkov et al. | 324/765 |
| 2002/0013058 A1 | * | 1/2002 | Tang | 438/692 |
| 2004/0263868 A1 | * | 12/2004 | Isei et al. | 356/630 |

FOREIGN PATENT DOCUMENTS

| JP | 10-70162 | 3/1998 |
|---|---|---|
| JP | 2000-283728 | 10/2000 |

* cited by examiner

*Primary Examiner*—Max Noori
(74) *Attorney, Agent, or Firm*—Wenderoth, Lind & Ponack, L.L.P.

(57) ABSTRACT

A measuring apparatus including a fixed stator, a rotor to rotate in the state of being disposed outside the center of rotation of the stator, a retaining mechanism for retaining a thin board on the rotor, and a measuring section to measure physical properties of the thin board. This construction makes it possible to avoid wind generated by rotation of the rotor in the vicinity of the thin board, and to suppress vibration of the thin board. Further, since a portion exposed to the thin board can be minimized, safe measurement can be implemented.

5 Claims, 20 Drawing Sheets

Fig.5
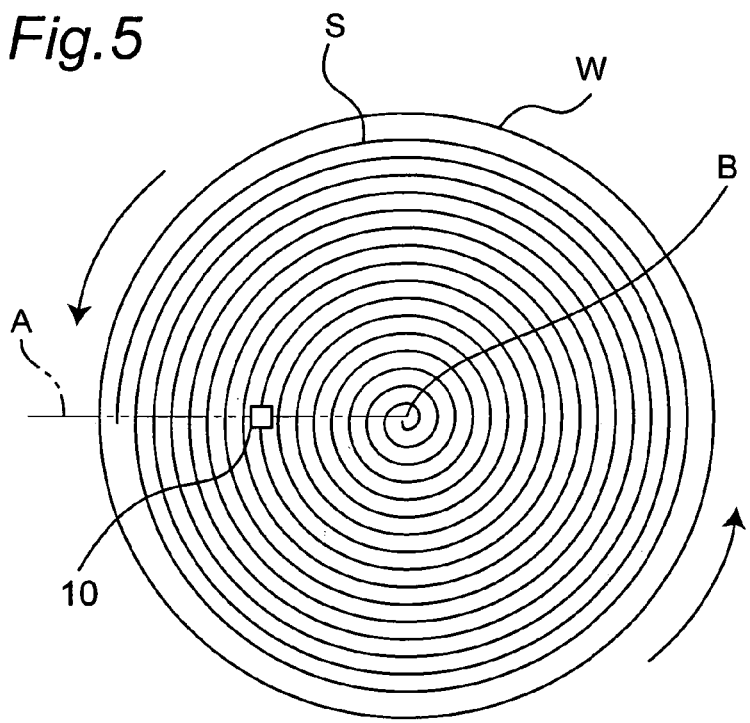
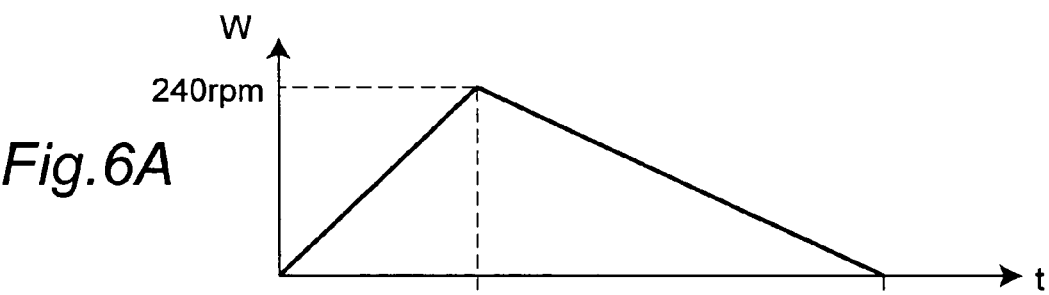
Fig.6A
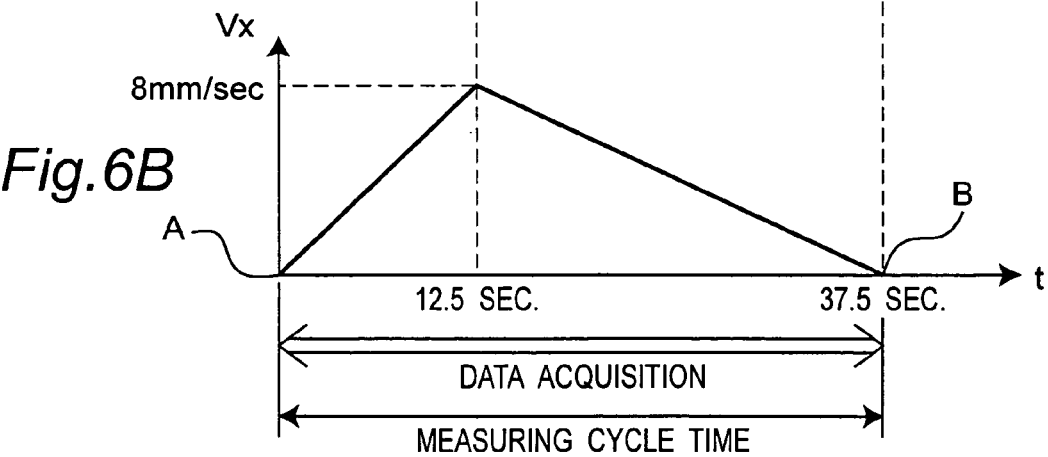
Fig.6B

MEASURING APPARATUS AND METHOD FOR THIN BOARD

BACKGROUND OF THE INVENTION

The present invention relates to measuring apparatus and method for thickness fluctuation in a thin board, and more particularly relates to measuring apparatus and method for a thin board for measuring and evaluating thickness fluctuation in the thin board which is required to have less thickness fluctuation in the plane direction that is orthogonal to the thickness direction thereof such as wafers for semiconductor manufacturing.

A conventional measuring apparatus for a thin board is described with reference to FIG. 19 to FIG. 23.

FIG. 19 is a schematic configuration view showing a first example of the conventional measuring apparatus for a thin board.

In FIG. 19, a thin board W is retained by retaining members 2a, 2b, 2c on a rotor 1 which is positioned inside the inner radius of a hollow spindle. The rotor 1 is rotated in the state in which the thin board W is retained, while a sensor unit 3 which moves in a linear direction is moved in conjunction with the rotation of the rotor 1, by which the thickness of the thin board W is measured in a spiral fashion (see, e.g., U.S. Pat. No. 4,280,354).

FIG. 20 and FIG. 21 are schematic configuration views showing a second example of the conventional measuring apparatus for a thin board, in which a thin board W is retained by a rotating rotor 4. FIG. 21 is a detailed view showing a measuring section in the second example of the measuring apparatus.

In FIG. 21, a stator 5 is provided on the outer circumference of the rotor 4, and the rotor 4 is supported by a pressure source inside the stator 5. The thin board W is retained by retaining members 6a, 6b, 6c provided on the rotating rotor 4. Therefore, the thin board W is disposed in the vicinity of the rotating rotor 4. In the state where the thin board W is retained, the rotor 4 is rotated while a sensor unit 7, which moves in linear direction, is moved in conjunction with the rotation of the rotor 4, by which the thickness of the thin board W is measured in a spiral fashion (see, e.g., Japanese unexamined patent publication No. 10-70162).

FIG. 22 is a schematic configuration view showing a third example of the conventional measuring apparatus for a thin board.

In FIG. 22, a thin board W is retained in a hollow spindle 8, and an optical probe composed of a stage 9 and an optical displacement gauge 10 for measuring displacement magnitude of interference fringes is moved in conjunction with the rotation of a rotor which is composed of the hollow spindle 8 and retains the thin board W, by which a plane of the thin board W is scanned through a spiral route and measurement of the thin board W is performed. In this case, scan and measurement are extended to an outer circumferential portion of the thin board W where there is a notch indicating crystal orientation of a wafer that is the thin board W (see, e.g., Japanese unexamined patent publication No. 2000-283728).

In the above-described conventional apparatus and measuring methods, the rotor 4 is disposed inside the stator 5 as shown in FIG. 23. According to this configuration, it becomes possible to make the shape of the rotor 4 more compact to facilitate manufacture of the apparatus, as well as to decrease a moment of inertia of the rotor 4 to facilitate acceleration/deceleration of the rotor 4. However, the configuration in which the rotor 4 is disposed inside the stator 5 causes the following problems. That is, since the thin board w is retained by the retaining members 6 in the center portion of the ring-shaped rotor 4, and the rotor 4 is present in the vicinity of the thin board w, rotation of the rotor 4 around a central axis 4a in the axial direction generates wind 4c in a hollow section 4b of the rotor 4. The wind 4c vibrates the thin board w and deteriorates measurement precision of the thin board w. Further, there is also a problem in that the widely exposed rotor portion which rotates presents a danger. Moreover, since the rotor is provided inside the stator, a large aperture hole on the stator for mounting of the rotor degrades the rigidity of the stator. Consequently, the rotation of the rotor generates vibration of the apparatus and further deteriorates measurement precision of the thin board w, while at the same time the rotation of the rotor distorted in a thrust direction further deteriorates measurement precision of the thin board w. Moreover, since the rotor is provided inside the stator, heat generated in a rotor driving section may tend to be trapped inside, thereby causing the measuring apparatus itself to be subject to thermal expansion and thereby affect the measurement precision of the thin board w.

SUMMARY OF THE INVENTION

Accordingly, an object of the present invention is to provide a measuring apparatus and method for a thin board with a high degree of precision and safety which overcomes the forgoing deficiencies.

In order to accomplish the above object, the present invention is constituted as shown below.

According to a thin board measuring apparatus of a first aspect of the present invention, there is provided a measuring apparatus for a thin board, comprising:

a fixed stator;

a rotor to rotate in a state of being disposed outside the stator;

a retaining mechanism for retaining the thin board on the rotor; and a measuring section to measure physical properties of the thin board.

According to the above configuration, the rotor is disposed outside the stator and rotates around the stator. Adopting this configuration enlarges the shape of the rotor, thereby making it difficult to manufacture the apparatus, and increases the moment of inertia of the rotor, which necessitates a drive source with larger capacity for driving the rotor. It is to be noted that a larger rotor increases torque though in this measuring apparatus, the rotated article is a thin board and therefore it is not necessary to increase torque. However, disposing the rotor outside the stator makes it possible to prevent wind, generated by rotation of the rotor in the vicinity of the thin board, from affecting the thin board, and to restrain vibration of the thin board. Therefore, the measurement precision of the thin board can be increased in comparison to the conventional case. Thus, in a measuring apparatus which is required to measure a thin board with extremely high measurement precision, the above configuration in which the rotor is disposed outside the stator makes an exceedingly effective configuration.

Further, disposing the stator on the center side while disposing the rotor outside the stator makes it possible to minimize a portion exposed to the thin board, so that even if the thin board falls from the rotor, it is possible to prevent the rotating rotor from coming into contact with the thin board and damaging thin boards such as wafers and causing resultant broken pieces to scatter, thereby allowing safe measurement.

Moreover, the above measurement apparatus may be designed so that the rotor may be in a circular shape having an aperture.

The retaining mechanism may have a nail member for disposing the thin board along diameter direction of the rotor in the center portion of the aperture of the rotor. Also, the stator may have a measurement precision increasing member which is disposed in the aperture of the rotor for supporting the rotor in a non-contact state and for preventing generation of aerial vibration caused by rotation of the rotor to affect measurement of the physical properties of the thin board. The measurement precision increasing member has a measurement aperture formed for disposing the measuring section opposed to the thin board.

The measurement aperture provided on the stator can take any shape as long as its size allows the measuring section to move to the outer circumferential edge of the thin board. For example, the shape of the measurement aperture may be a circle concentric with the rotor. It is to be noted that in order to decrease axial run-out of the thin board which rotates in conjunction with the rotor and to increase measurement precision, it is necessary to enhance rigidity of the stator which supports the rotor in a non-contact state. Consequently, the measurement aperture should preferably be small and therefore it can be dimensioned to a minimum size which allows the moving section to move. Therefore, the measurement aperture may be formed in a rectangular shape which extends from the center of rotation of the thin board to the outer circumferential edge of the thin board along the diameter direction and which allows the measuring section to move.

Further, while the optical displacement gauge is moved linearly in a radial direction of the thin board, radial directional data of the thin board is measured. Further, while the optical displacement gauge is moved linearly in the radial direction of the thin board and the thin board is rotated, the plane of the thin board is scanned to measure plane data.

According to the present invention, it becomes possible to avoid the wind generated by rotation of the rotor in the vicinity of the thin board, thereby allowing vibration of the thin board to be restrained and high precision measurement to be achieved.

Moreover, it becomes possible to minimize a portion exposed to the thin board, so that even if the thin board falls from the rotor, it is possible to prevent the rotating rotor from coming into contact with the thin board and damaging thin boards such as wafers and causing the resultant broken pieces to be scattered, thereby allowing safe measurement.

Moreover, the thin-type configuration and high rigidity allow a rotating section to be constituted with high precision.

Moreover, concentric circles measurement makes it possible to measure even positions from the outer circumferential portion of the thin board, thereby allowing more accurate measurement.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5 is an explanatory view showing the measuring operation performed on a wafer in the embodiment of the present invention;

FIG. 6A is a view showing the operations with time of the wafer and the optical displacement gauge in the embodiment of the present invention;

FIG. 6B is a view showing the operations with time of the wafer and the optical displacement gauge in the embodiment of the present invention;

DETAILED DESCRIPTION OF THE PREFERRED EMBODIMENTS

Figure 1:
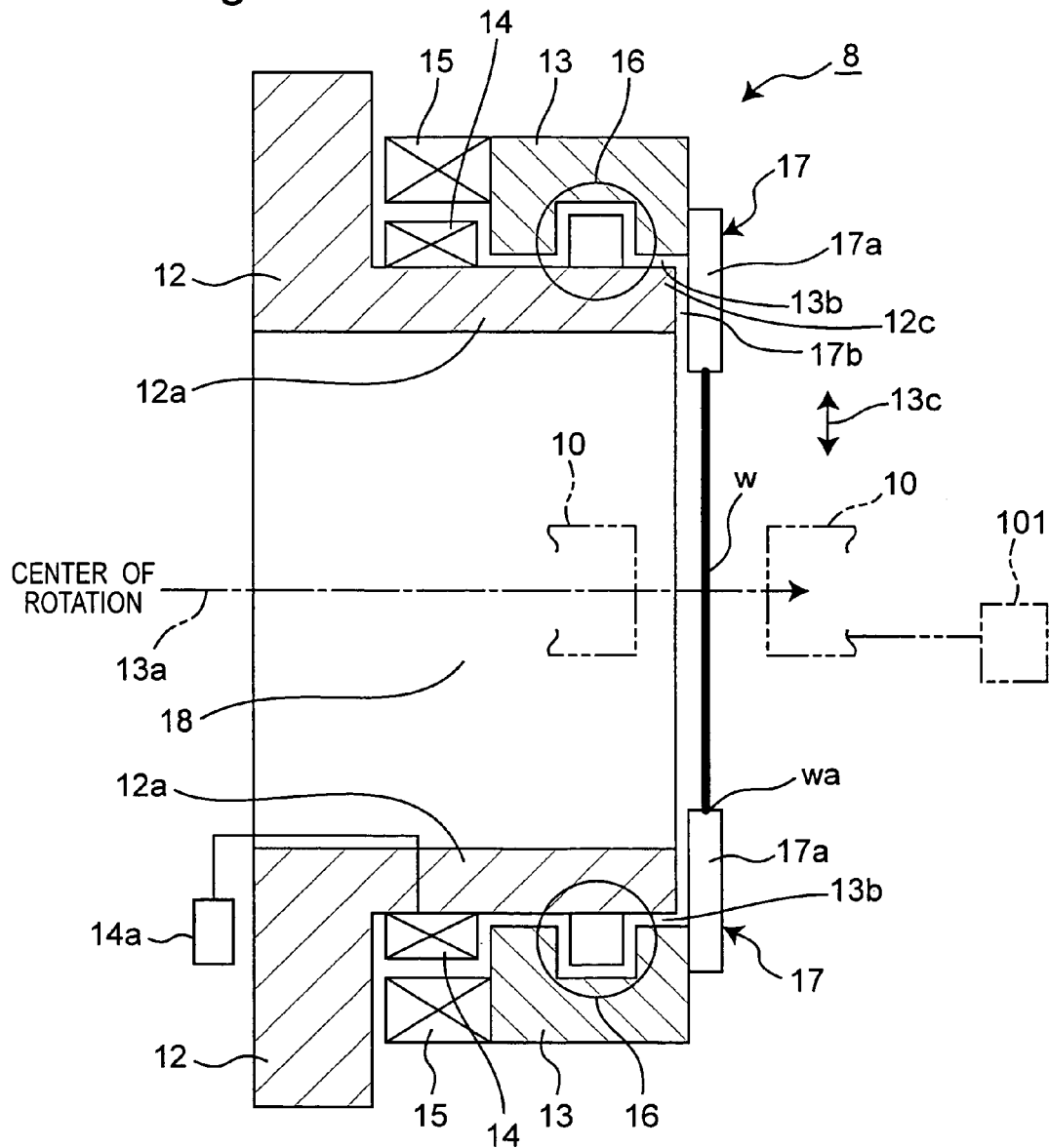
FIG. 1 is a schematic cross sectional view showing one example of a hollow spindle in an embodiment of the present invention.

Before the description of the present invention proceeds, it is to be noted that like parts are designated by like reference numerals throughout the accompanying drawings.

Hereinbelow, one embodiment of the present invention will be described with reference to FIG. 1 to FIG. 18.

Figure 12:
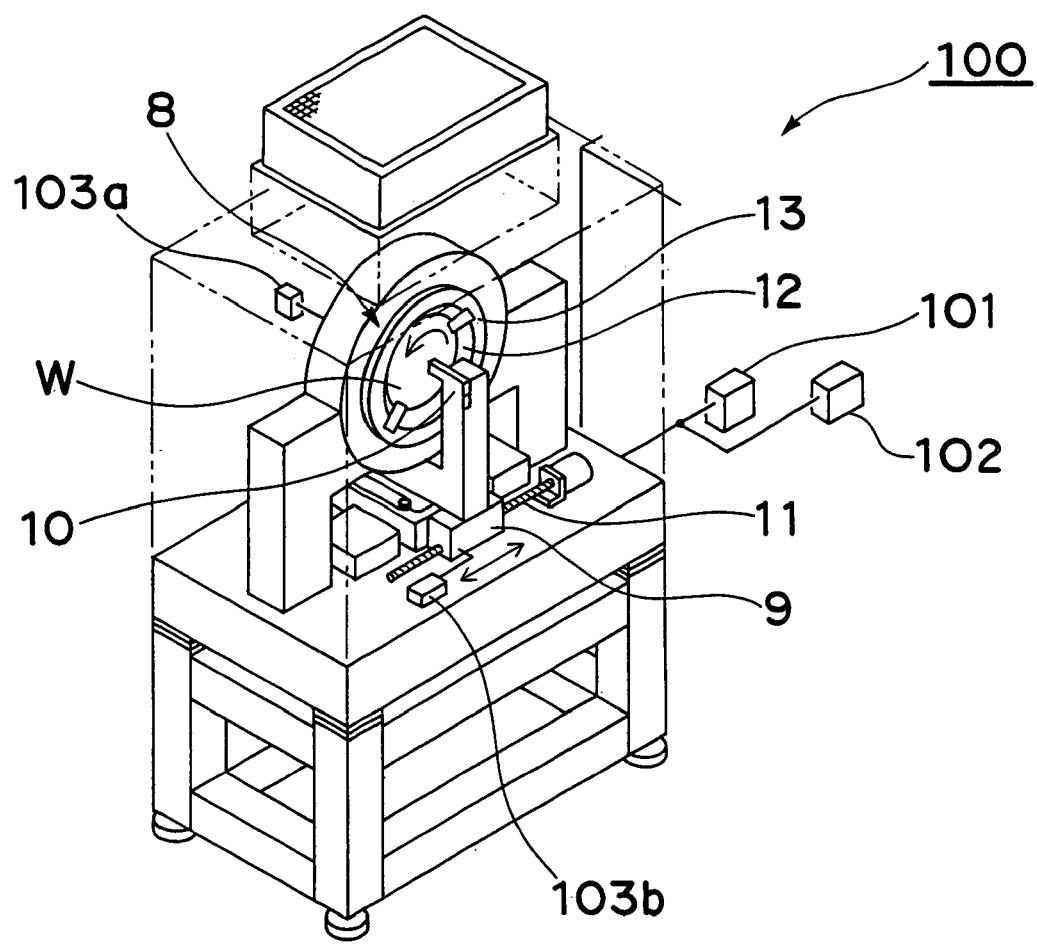
FIG. 12 is a perspective view showing a measuring apparatus in the embodiment of the present invention.
Figure 22:
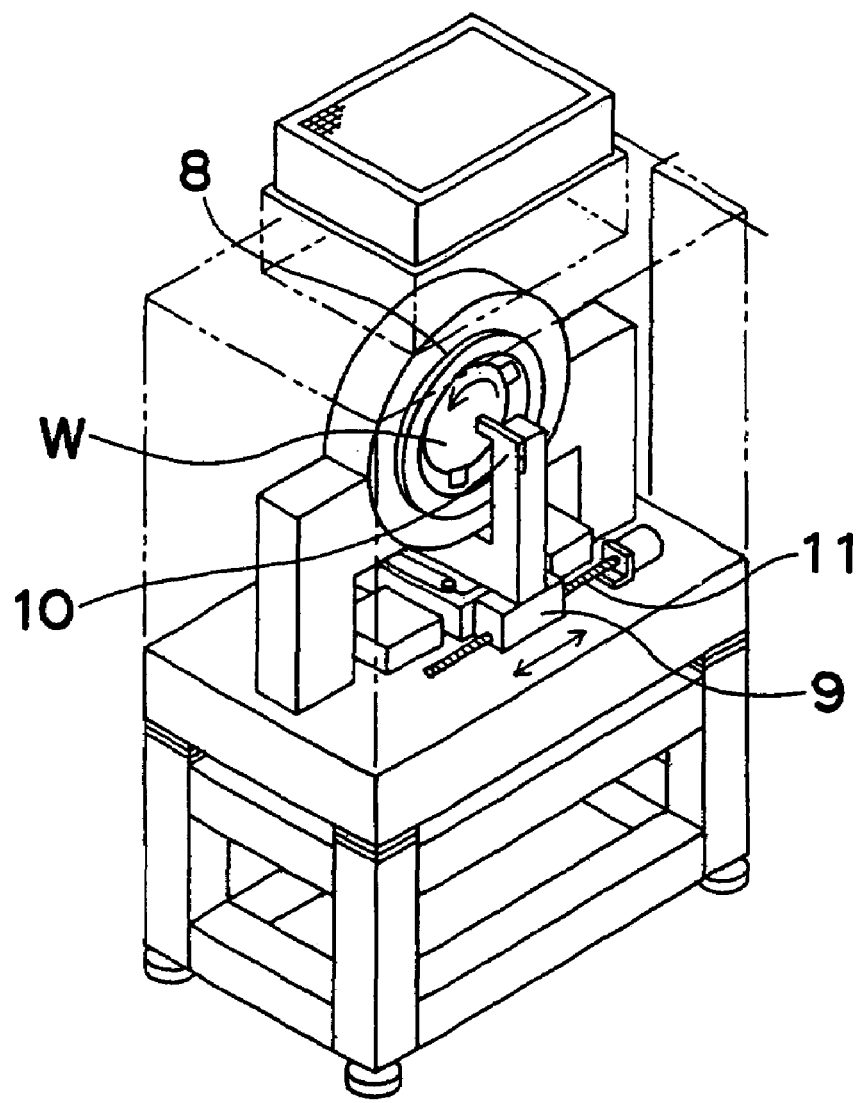
FIG. 22 is a schematic view showing a third example of the conventional measuring apparatus for a thin board.

A measuring apparatus for a thin board in one embodiment of the present invention uses a measuring apparatus 100 shown in FIG. 12 having a measuring apparatus configuration almost similar to the conventional measuring apparatus configuration shown in FIG. 22. The measuring apparatus 100 has a measuring arithmetic section 101 connected to optical displacement gauges 10 for measuring a thin board W and a control unit 102 for controlling operation of each component section included in the measuring apparatus 100. The measuring apparatus 100 in one embodiment of the present invention is different from the conventional measuring apparatus in a later-described configuration of a hollow spindle 8.

Figure 13:
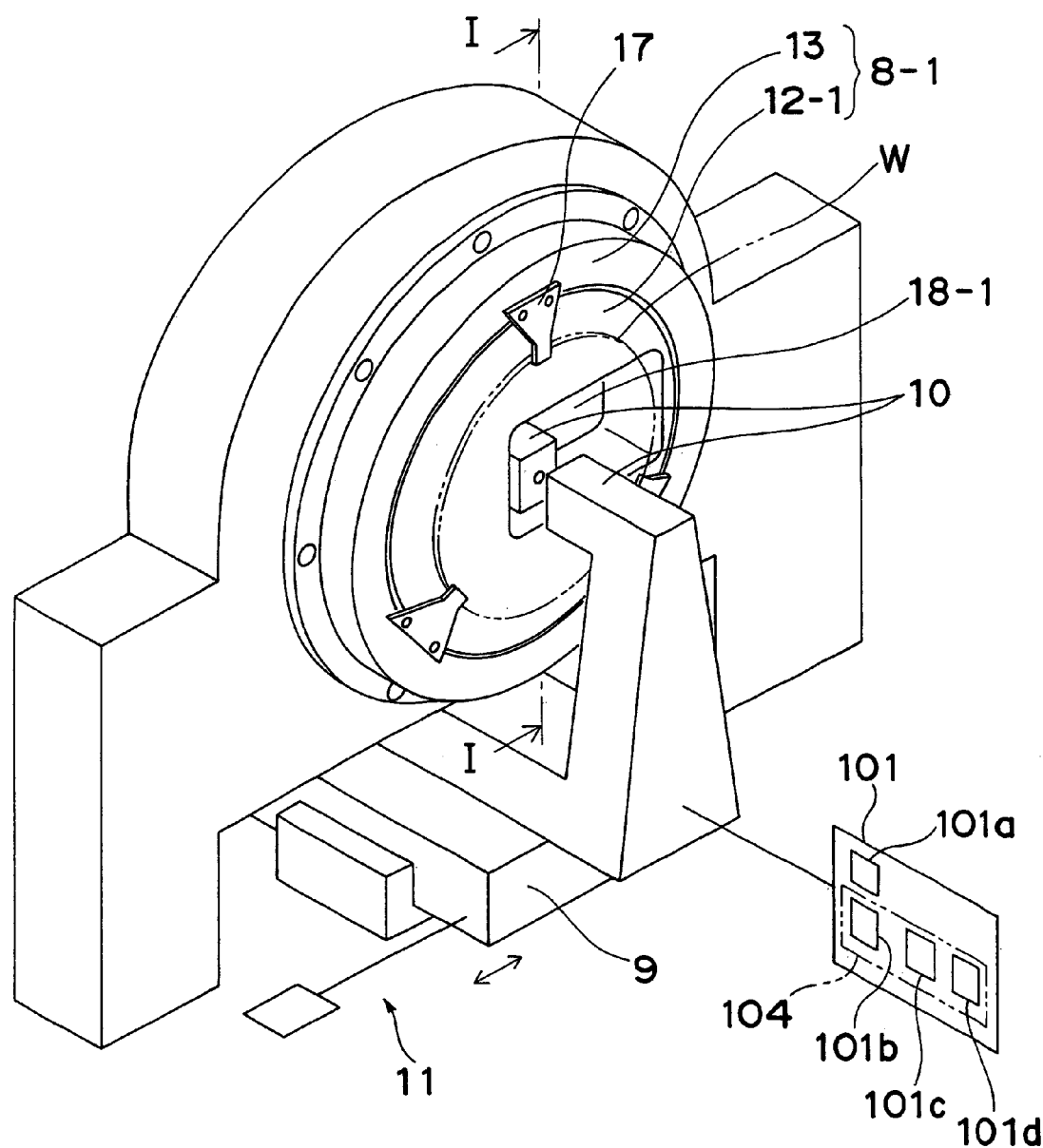
FIG. 13 is a perspective view showing a hollow spindle included in FIG. 12.
Figure 14:
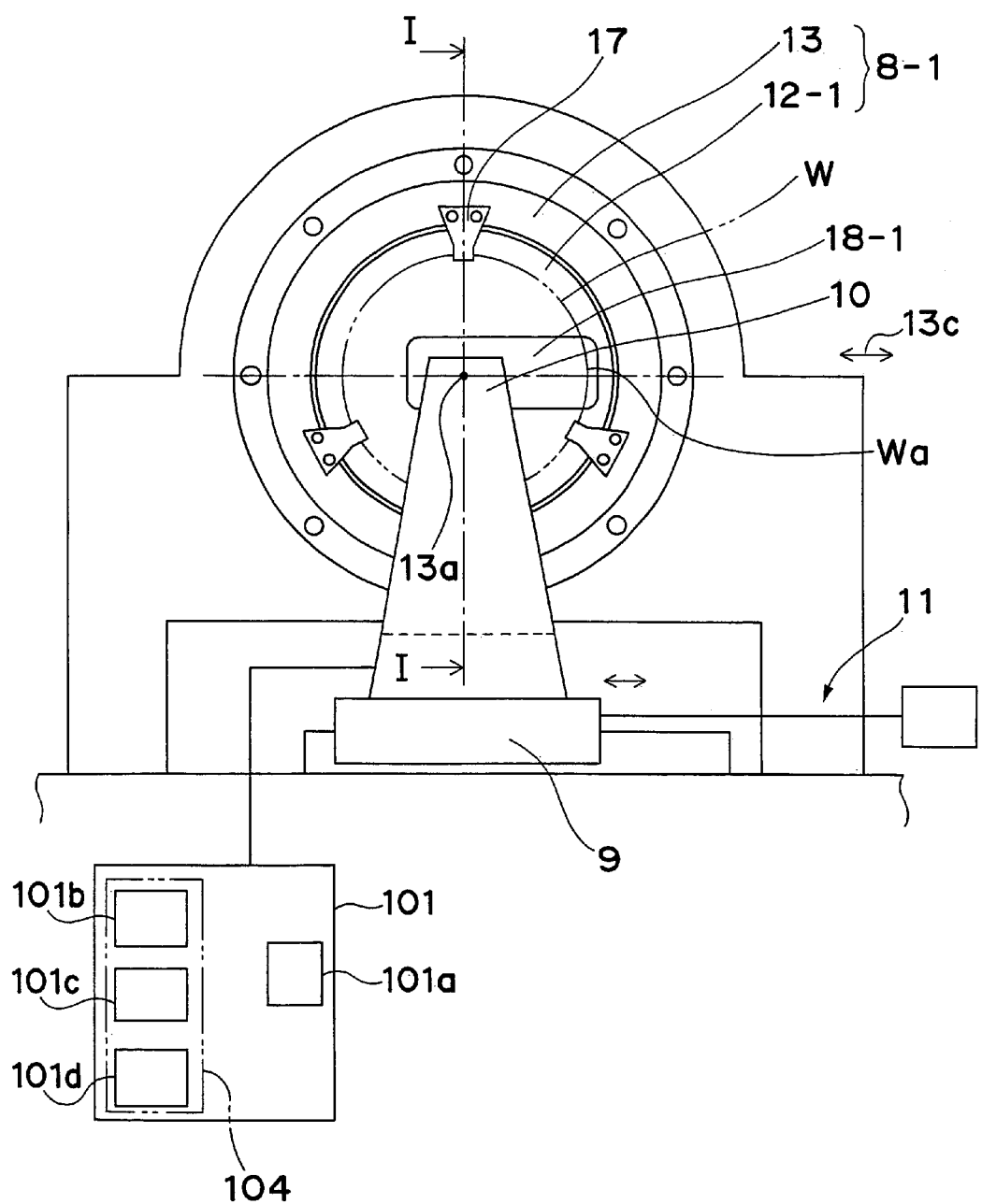
FIG. 14 is a front view showing the hollow spindle shown in FIG. 13.

In the configuration and operation of the measuring apparatus in one embodiment of the present invention, as shown in FIG. 12, FIG. 13 and FIG. 14, a wafer W exemplifying the thin board is retained, in the state of standing vertically, by a circular-shaped rotor constituting the hollow spindle 8, and the wafer w is rotated in a circumferential direction thereof by rotary driving of the rotor with the wafer stood vertically. It is to be noted that the thin board is also exemplified by a magnetic disk and the like. On both surface sides of the wafer W, the optical displacement gauges 10 are disposed. Although only one surface side is illustrated in FIG. 22, the optical displacement gauge 10 is also disposed on an opposite-side surface at a symmetrical position. A pair of the optical displacement gauges 10 are mounted in such a way that their entire bodies can move in a direction parallel to the surface of the wafer W, so that measuring positions for displacement by the optical displacement gauges 10 are moved from side to side along the diameter direction of the wafer W. More specifically, a stage 9 for the optical displacement gauges 10 is linearly moved by rotary driving of a ball thread 11.

(Configuration of Hollow Spindle)

FIG. 1 is a cross sectional view showing one example of the schematic configuration of the hollow spindle 8 in the embodiment of the present invention.

In FIG. 1, the hollow spindle 8 has a configuration including a circular-shaped rotor 13 which is disposed outside a fixed stator 12 and has an aperture 13b, a coil 14 disposed on an outer circumferential portion of the stator 12, a magnet 15 disposed on the rotor 13 at a position opposed to the coil 14, air bearings 16 formed between the stator 12 and the rotor 13, and a plurality of retaining mechanisms 17 disposed on the rotor 13 and extending toward a center of rotation 13a for retaining the wafer W. In the hollow spindle 8, by applying electric power from an electric power section 14a to the coil 14, the rotor 13 rotates about the center of rotation 13a around the stator 12 while being guided by the stator 12.

Figure 23:
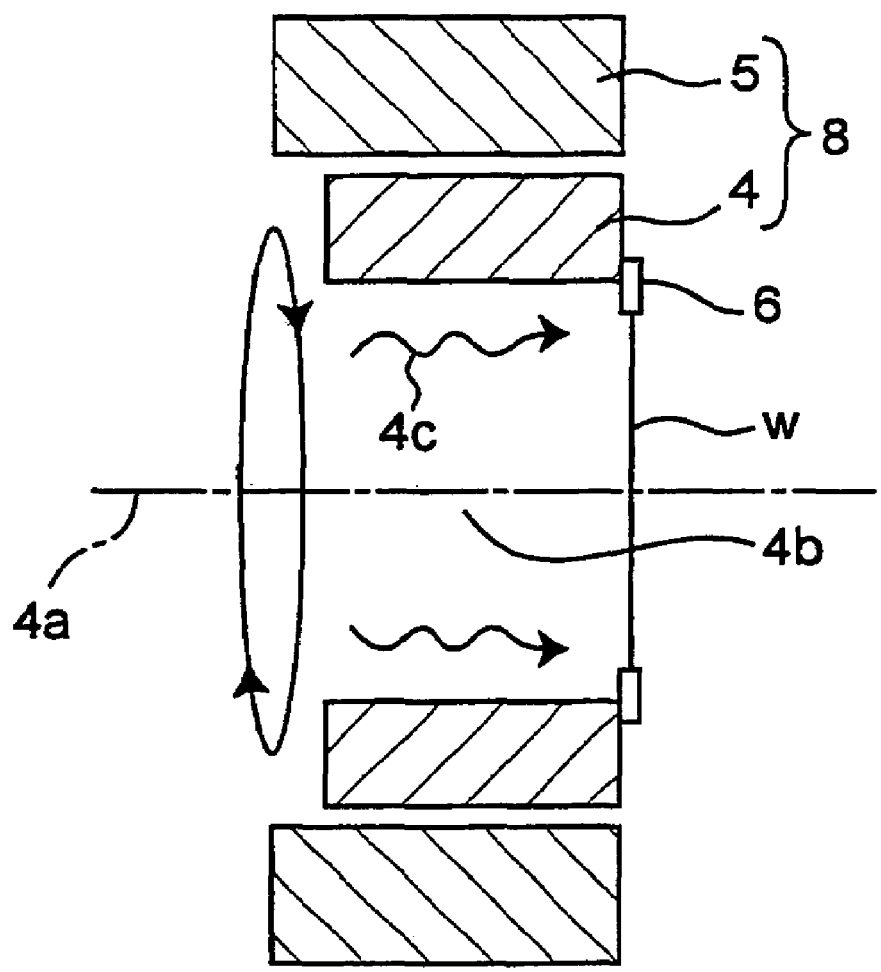
FIG. 23 is an explanatory view showing deficiencies of the conventional measuring apparatus for a thin board.

More specifically, the stator 12 has a measurement precision increasing member 12a which is disposed at the aperture 13b of the rotor 13 for supporting the rotor 13 in a non-contact state and for preventing air vibration which is caused by rotation of the rotor 13 and affects measurement of physical properties of the thin board W, i.e., the wind 4c described with reference to FIG. 23, is prevented from being generated, and a measurement aperture 18 formed by the measurement precision increasing member 12a in conformity with the aperture 13b.

Figure 18:
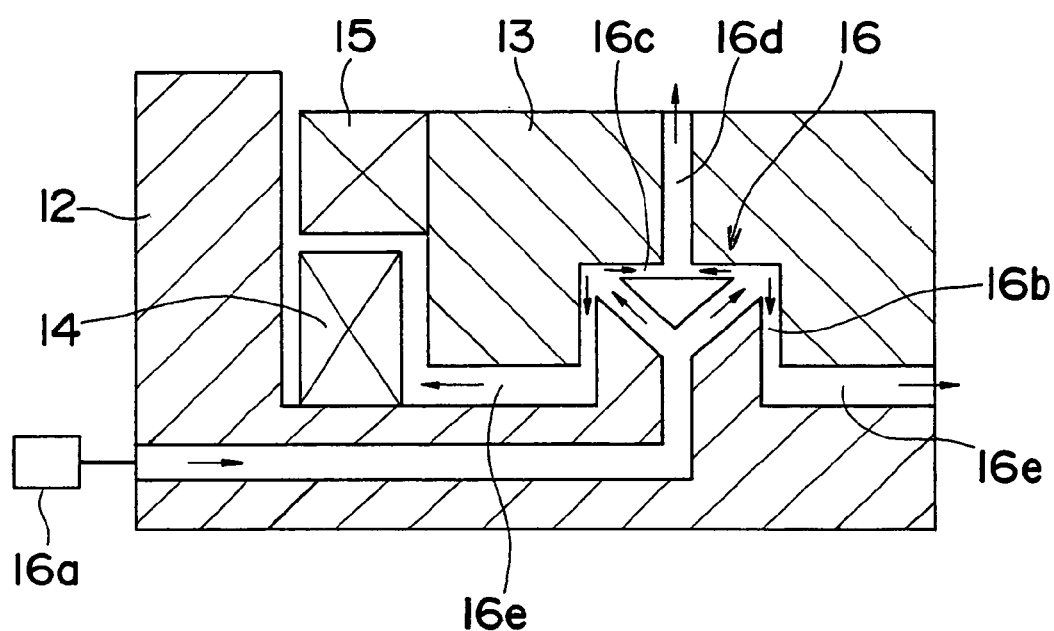
FIG. 18 is a cross sectional view showing the configuration of an air bearing included in the hollow spindle shown in FIG. 1.
Figure 19:
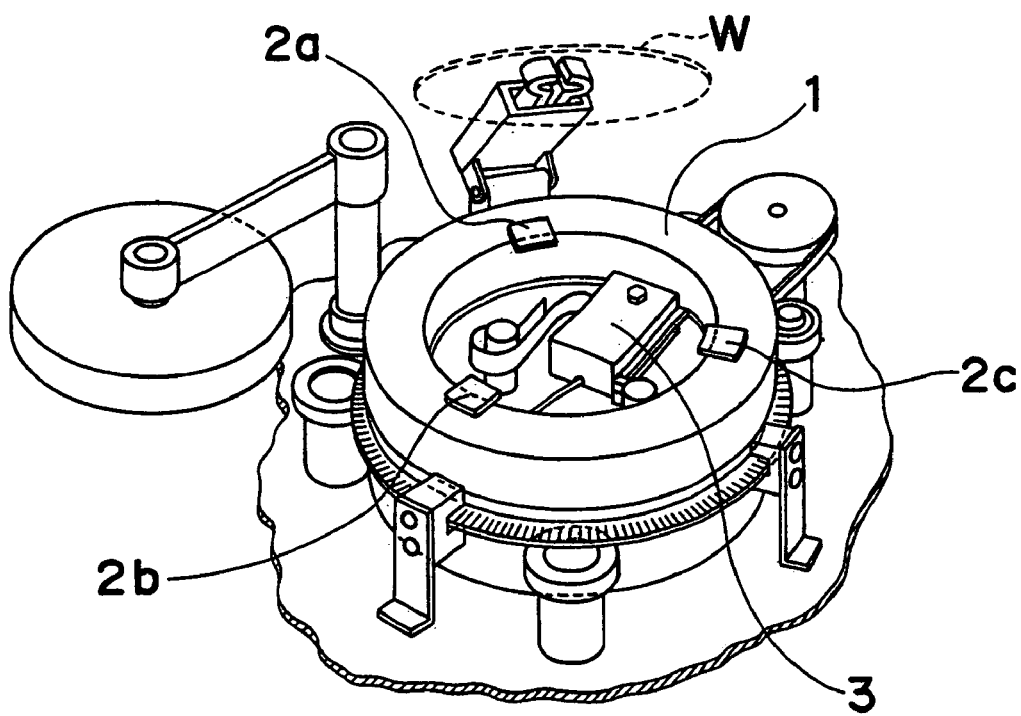
FIG. 19 is a schematic view showing a first example of a conventional measuring apparatus for a thin board.
Figure 20:
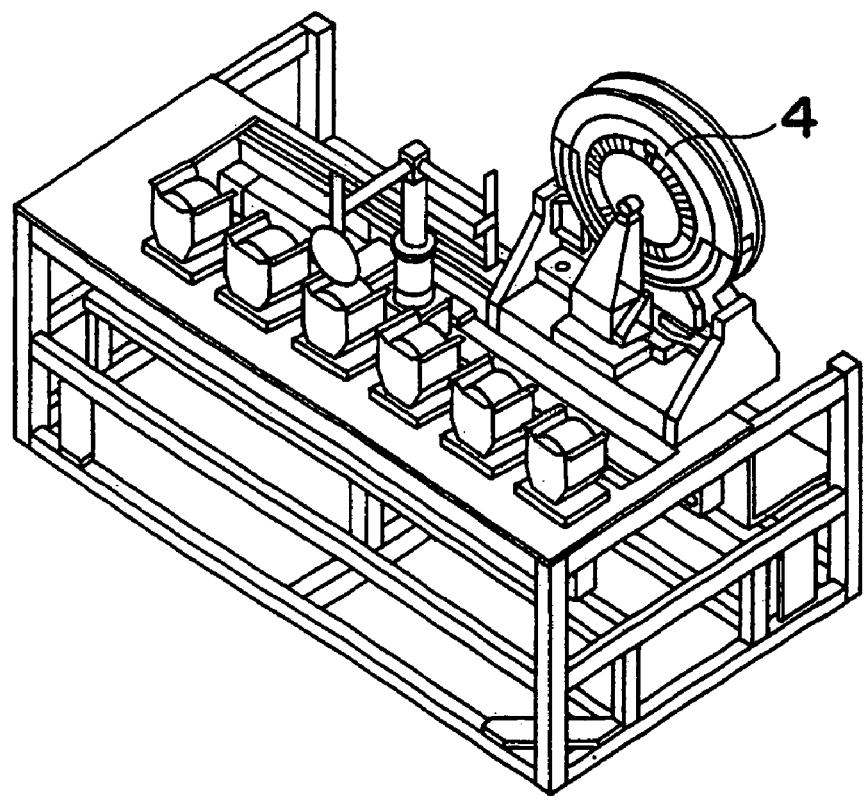
FIG. 20 is a schematic view showing a second example of the conventional measuring apparatus for a thin board.
Figure 21:
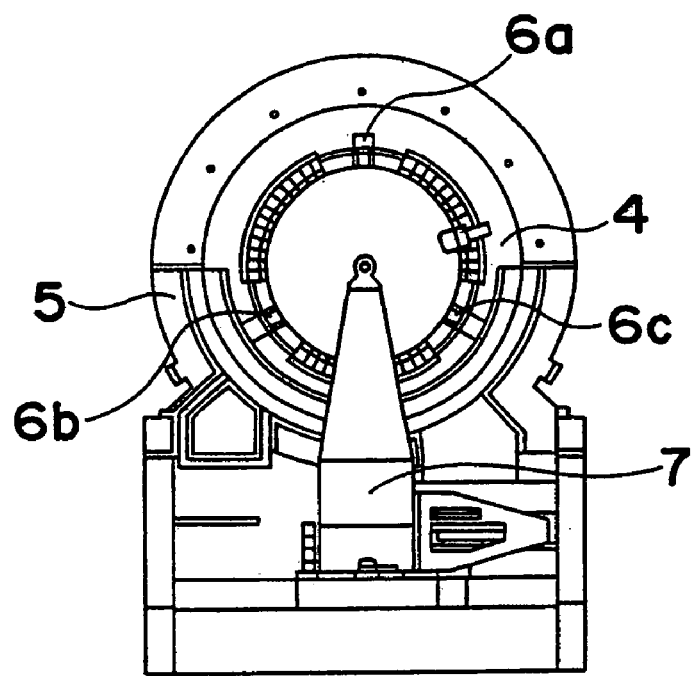
FIG. 21 is a schematic view showing the second example of the conventional measuring apparatus for the thin board.

Description is given of the air bearing 16 with reference to FIG. 18. Compressed air fed from a gas feed source 16a to the stator 12 travels through a passage inside the stator 12. After passing microscopic passages 16b and 16c of about 10 μm formed between the stator 12 and the rotor 13, the compressed air is discharged outside through a discharge hole 16d formed in the rotor 13 and gaps 16e, 16e between the stator 12 and the rotor 13. The stator 12 has thus-structured bearing passages disposed at three places in a circumferential direction of the stator 12 at intervals of 120 degrees. In this configuration, gas such as air flowing through the passages 16c while keeping its pressure gradient allows the rotor 13 to float from the stator 12 in a radial direction and provides a cushion function, whereas the gas such as air flowing through the passages 16b while keeping its pressure gradient ensures a gap between the stator 12 and the rotor 13 in a thrust direction and provides a cushion function. Therefore, the air bearings 16 support the rotor 13 rotatably in an out of contact state with the stator 12, and further restrain displacement of the rotor 13 in the radial direction and the thrust direction, making it possible to implement high precision measurement.

Each of the retaining mechanisms 17 has a nail portion 17a for positioning the thin board w along a diameter direction 13c of the rotor 13 at a center portion of the aperture 13b of the rotor 13. It is to be noted that since the retaining mechanisms 17 rotate together with the rotor 13, a gap of about 5 mm should preferably be interposed between each retaining mechanism 17 facing the stator 12 and the stator 12 as shown in FIG. 1 or the nail portion 17a should preferably be formed into a streamline shape so as to prevent an airflow generated by the rotation from affecting the measurement of the thin board w.

Further, the optical displacement gauge 10 as an example to function as a measuring section is disposed inside the measurement aperture 18 in the state of facing the thin board w.

According to the above structure, since the rotor 13 is disposed outside the stator 12, wind generated from an inner radial face of the rotor 13 by the rotation of the rotor 13 is shielded by the measurement precision increasing member 12a of the stator 12. Therefore, the wafer exemplifying the thin board is not vibrated by the wind 4c as is the case in the conventional apparatus. Further, since the rotor 13 is disposed outside the stator 12, the coil 14 and the magnet 15, which constitute a drive section for rotating the rotor 13, are also disposed outside the stator 12. This allows effective dissipation of heat generated in the drive section, and allows an influence of the heat exerted over the measuring apparatus 100 to be reduced. It is also possible to provide a gas feed unit for cooling the drive section separately from the air feed for the air bearings 16. It is further possible to adopt a structure for enhancing heat dissipation of the drive section, that is, a radiating fin for example can be provided.

Further, even if the wafer falls down during measurement, the rotating rotor will not damage the wafer, thereby allowing implementation of safe measurement.

Figure 2:
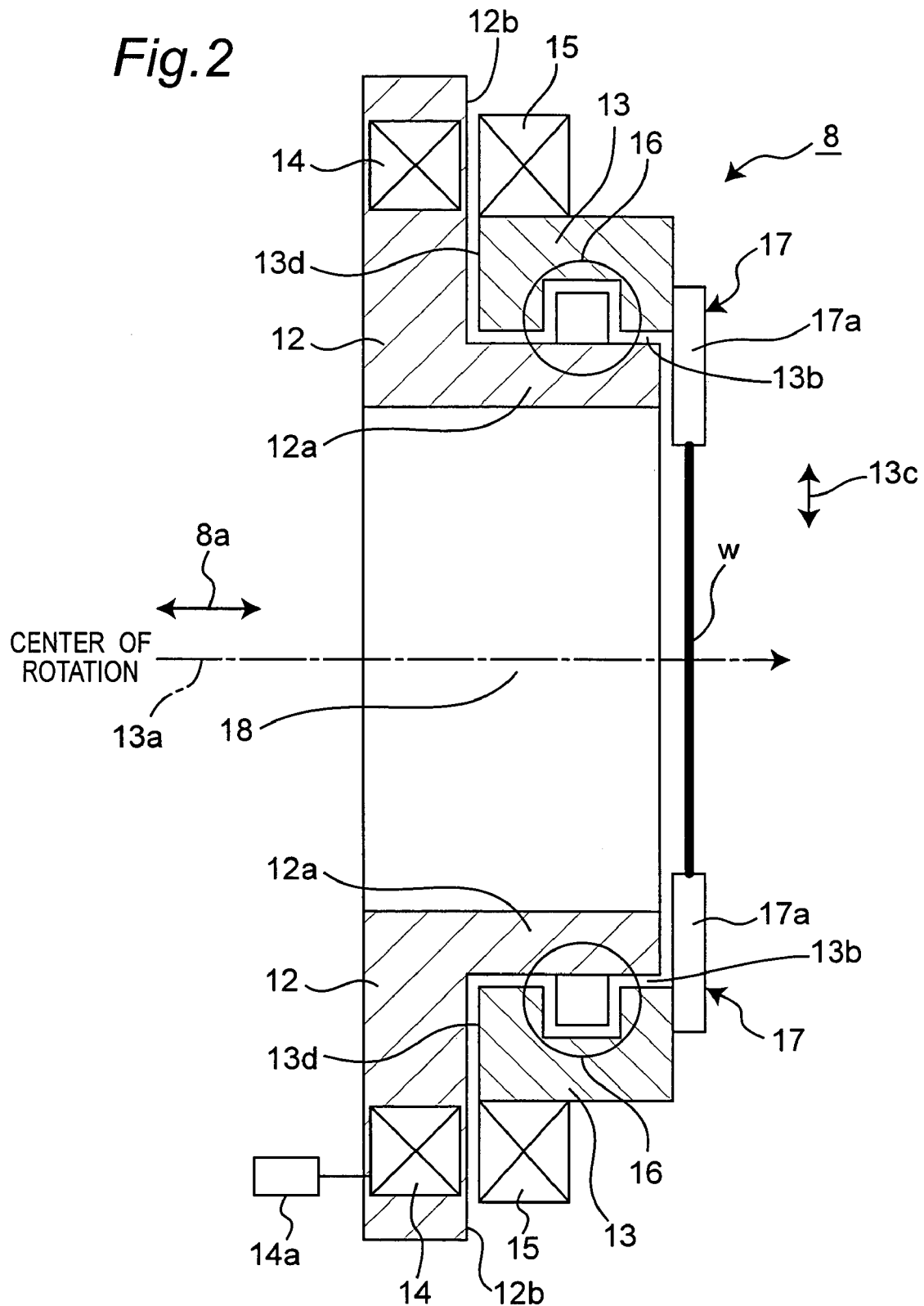
FIG. 2 is a schematic cross sectional view showing another example of the hollow spindle in the embodiment of the present invention.

Also, FIG. 2 shows a schematic cross sectional view of another example of the hollow spindle 8.

FIG. 2 is different from FIG. 1 in that the coil 14 disposed on the stator 12 and the magnet 15 disposed on the rotor 13 are disposed on their respective thrust faces 12b and 13d.

According to the above structure, it becomes possible to decrease a thickness of the hollow spindle 8 in an axial direction 8a, and particularly it becomes possible to make the entire apparatus more compact when the thin board w is measured from both sides of the thin board in a thickness direction 8a parallel to the axial direction 8a.

Further, shortening a placing distance between the optical displacement gauges 10 disposed at a front surface and a back surface of the thin board w makes it possible to enhance the rigidity of the entire apparatus, and moreover the enhancing rigidity makes it possible to reduce the influence of disturbance vibration, thereby also allowing implementation of high precision.

Figure 15:
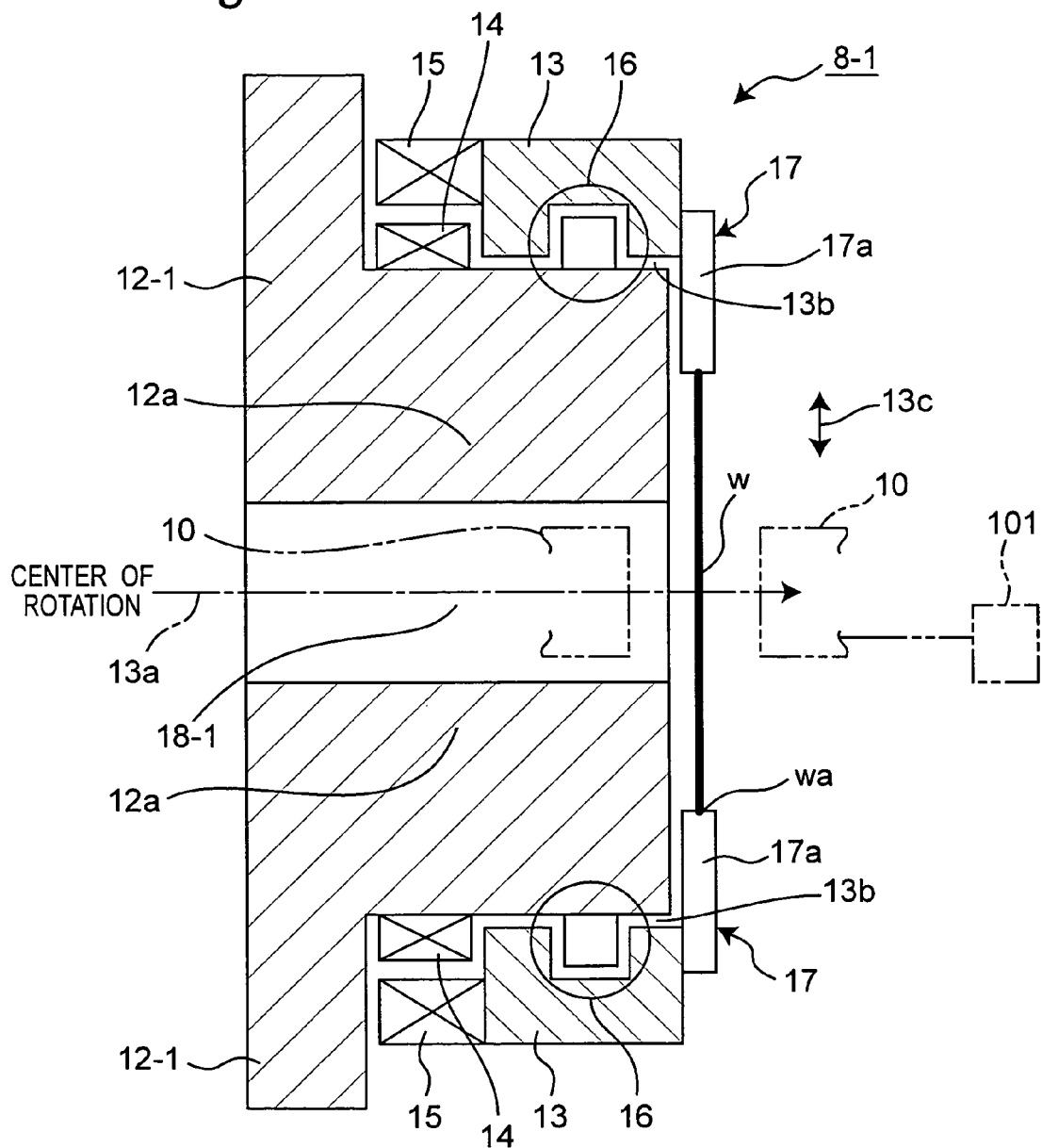
FIG. 15 is a cross sectional view showing the hollow spindle shown in FIG. 13.

Description is further given of another example of the hollow spindle 8 with reference to FIG. 13 to FIG. 17. FIG. 13 and FIG. 14 are views showing only a portion of the hollow spindle 8 in the measuring apparatus 100, and FIG. 15 shows a cross section taken along line I—I in FIG. 13 and FIG. 14.

In the above-stated hollow spindle 8 as shown in FIG. 1 and FIG. 2, the measurement aperture 18 formed by the measurement precision increasing member 12a of the stator 12 provided inside the rotor 13 is a circular aperture centered at the center of rotation 13a, the aperture being dimensioned to be larger in diameter than the thin board w. In a hollow spindle 8-1 shown in FIG. 13 to FIG. 16, a measurement precision increasing member 12a of a stator 12-1 provided inside the rotor 13 has, as shown in the drawings, a measurement aperture 18-1 having a minimum dimension sufficient to allow the optical displacement gauges 10 to move. The measurement aperture 18-1, as shown in FIG. 14 for example, is in a rectangle shape extending from the center of rotation 13a of the thin board w to an outer circumferential edge wa along the diameter direction 13c of the thin board w so as to allow movement of the optical displacement gauges 10. It is to be noted that in reality, the measurement aperture 18-1 extends beyond the center of rotation 13a and the outer circumferential edge wa of the thin board w in the diameter direction 13c so as to allow the optical displacement gauges 10 to move. More specifically, since an outer circumference of the stator 12 is larger in dimension than the outer circumferential edge wa of the thin board w, the measurement aperture 18-1 extends to a stator outer circumferential vicinity 12c, i.e., a vicinity portion of the outer circumference of the stator 12 shown in FIG. 1.

Thus, the hollow spindle 8-1 having the stator 12-1 implements the above-stated effect brought about by the hollow spindle 8, i.e., the effect that disposing the rotor 13 outside the stator 12-1 prevents the wind 4c generated from the inner radial face of the rotor 13 by the rotation of the rotor 13 from vibrating the thin board w. Further, the measurement aperture 18-1 in the stator 12-1 is smaller in aperture area than the measurement aperture 18 in the stator 12. Therefore, the rigidity of the hollow spindle 8-1 can be enhanced so as to be larger than that of the hollow spindle 8. This makes it possible to further reduce rotation of the rotor 13 distorted in the thrust direction or the radial direction, which prevents the portion of the hollow spindle 8-1 from vibrating, and thereby allows further enhances the measurement precision of the thin board w.

Figure 16:
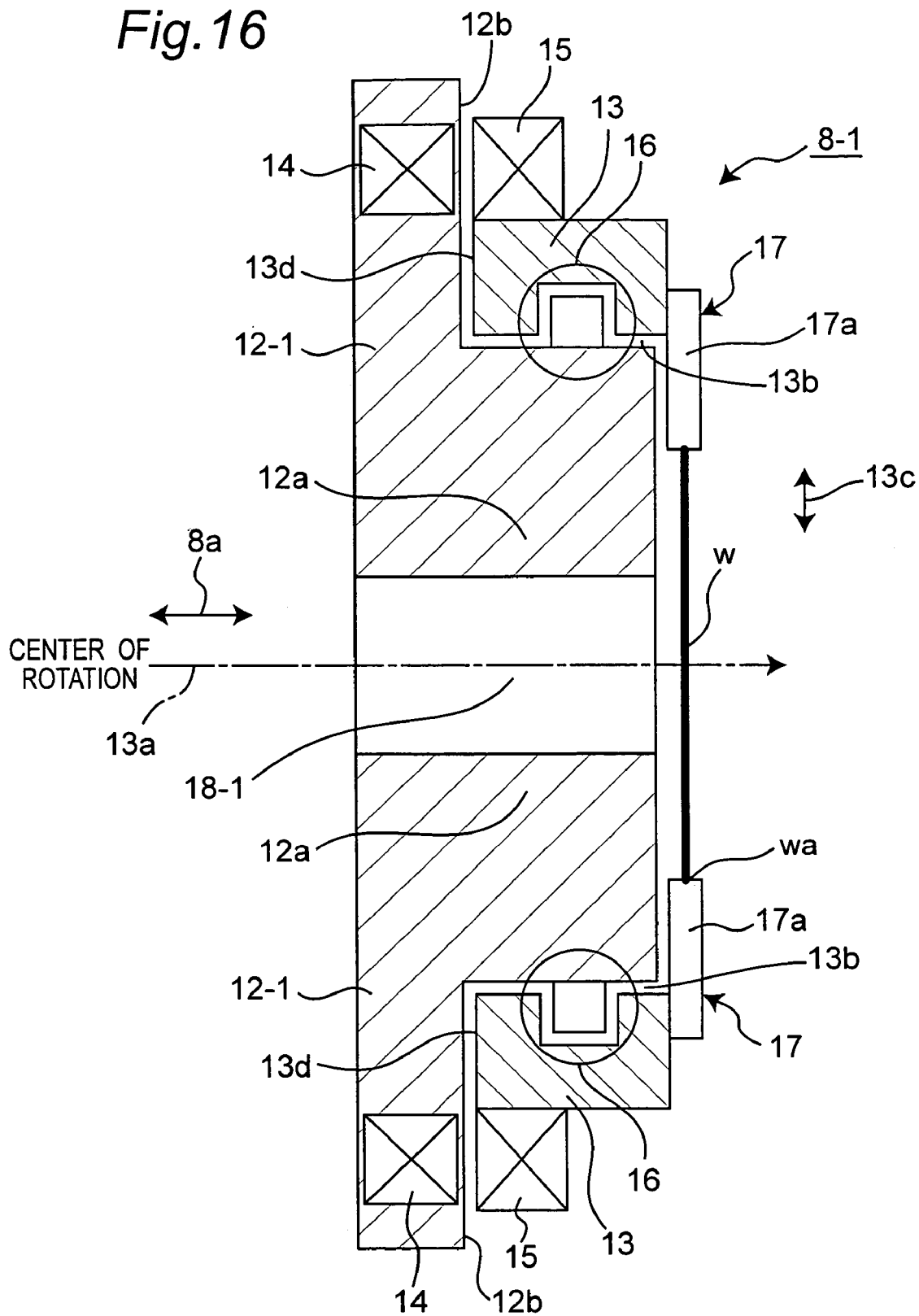
FIG. 16 is a cross sectional view showing another example of the hollow spindle shown in FIG. 13.

FIG. 16 shows a modified example of the hollow spindle 8-1, which has a configuration corresponding to the modified example of the hollow spindle 8 which is described with reference to FIG. 2. According to the configuration, the hollow spindle 8-1 makes it possible to further implement the effect possessed by the hollow spindle 8 shown in FIG. 2.

Figure 17:
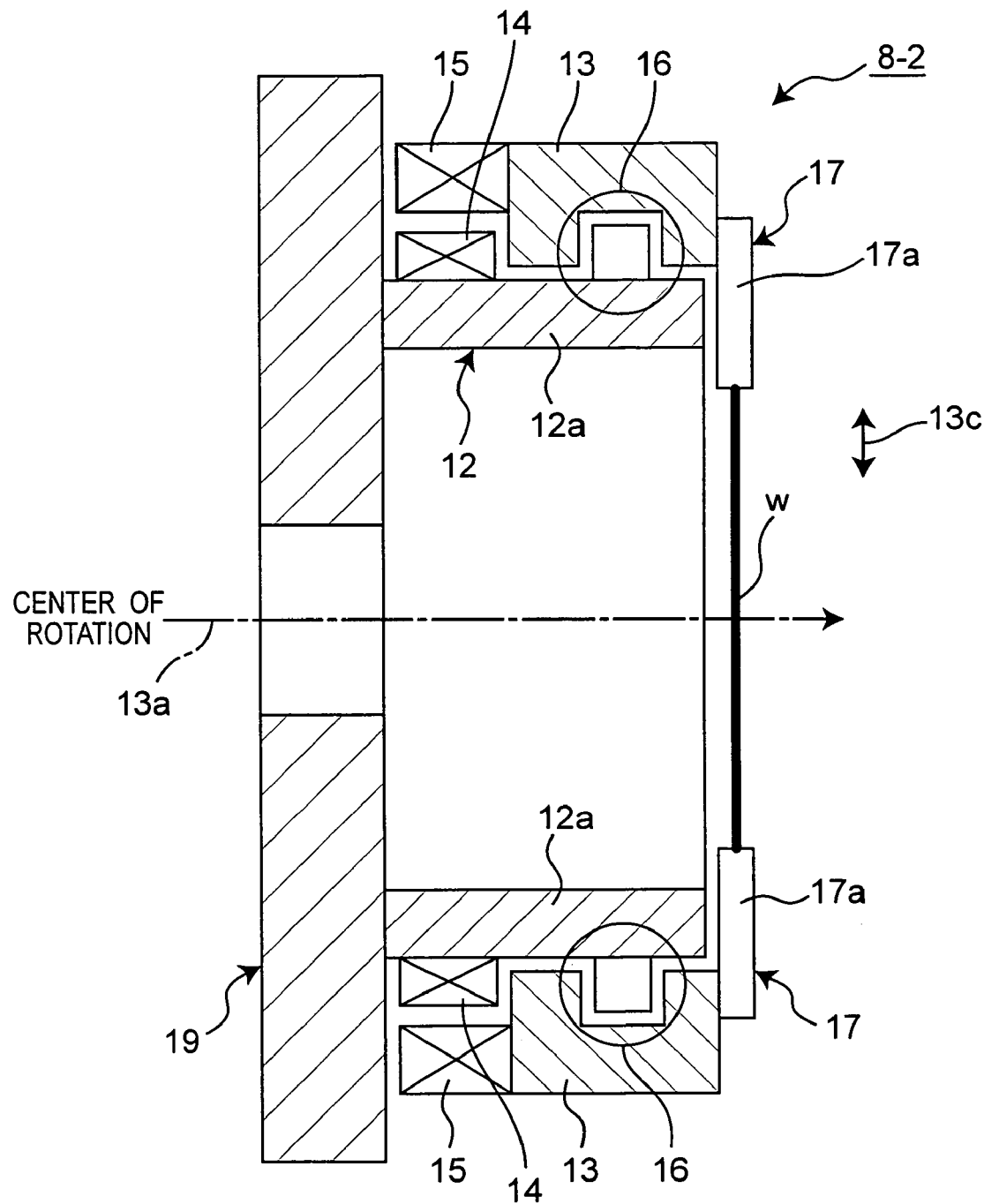
FIG. 17 is a cross sectional view showing another example of the hollow spindle included in the measuring apparatus in the embodiment of the present invention.

Further, in the hollow spindle 8-2 shown in FIG. 17, a stator may be constituted only from a measurement precision increasing member 12a and the measurement precision increasing member 12a may be constituted integrally with a base member 19.

In the case of adopting a configuration in which a stator is disposed outside and a rotor is disposed inside, the stator for supporting the rotor is positioned outside, so that an apparatus configuration grows in size and weight. On the other hand, as described above, by adopting the configuration in which the rotor 13 is disposed outside the stator 12, the stator for supporting the rotor in the non-contact state is positioned inside, which makes it possible to make the apparatus configuration more compact and allows a reduction in weight.

(Optical Displacement Gauge)

Figure 3:
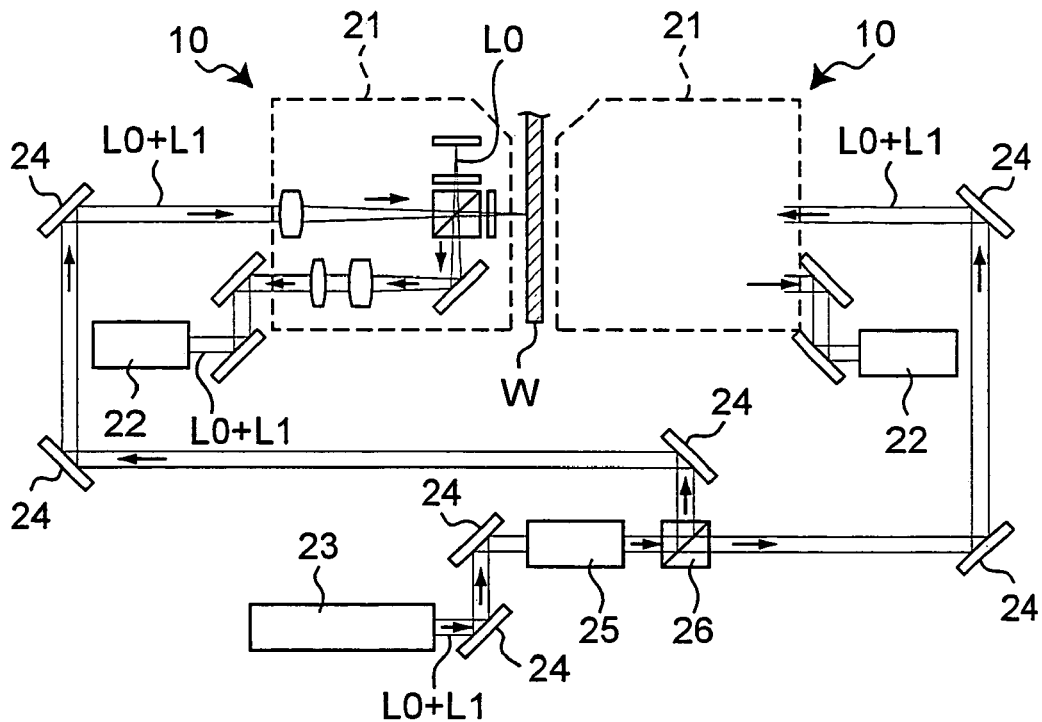
FIG. 3 is a schematic view showing an optical displacement gauge in the embodiment of the present invention.

FIG. 3 is a configuration view of the optical displacement gauges 10 in the embodiment of the present invention.

In FIG. 3, the optical displacement gauges 10, 10 on both sides of the wafer w respectively have measuring optical systems 21, 21 and light receiving portions 22, 22, and each of them operates with one coherent light beam outputted from a laser output unit 23.

The laser output unit 23 uses a frequency stabilized He-Ne laser and outputs an output light beam L0+L1 formed by mixture of a reference light beam L0 and a measurement light beam L1. The output light beam L0+L1 outputted from the laser output unit 23 is directed by a plurality of mirrors 24 and travels through an isolator 25, and then is split by a beam splitter 26 into two directions. The split output light beams L0+L1 further travel as directed by a plurality of the mirrors 24 and are fed to the measuring optical systems 21, 21 on both sides of the wafer w.

Figure 4:
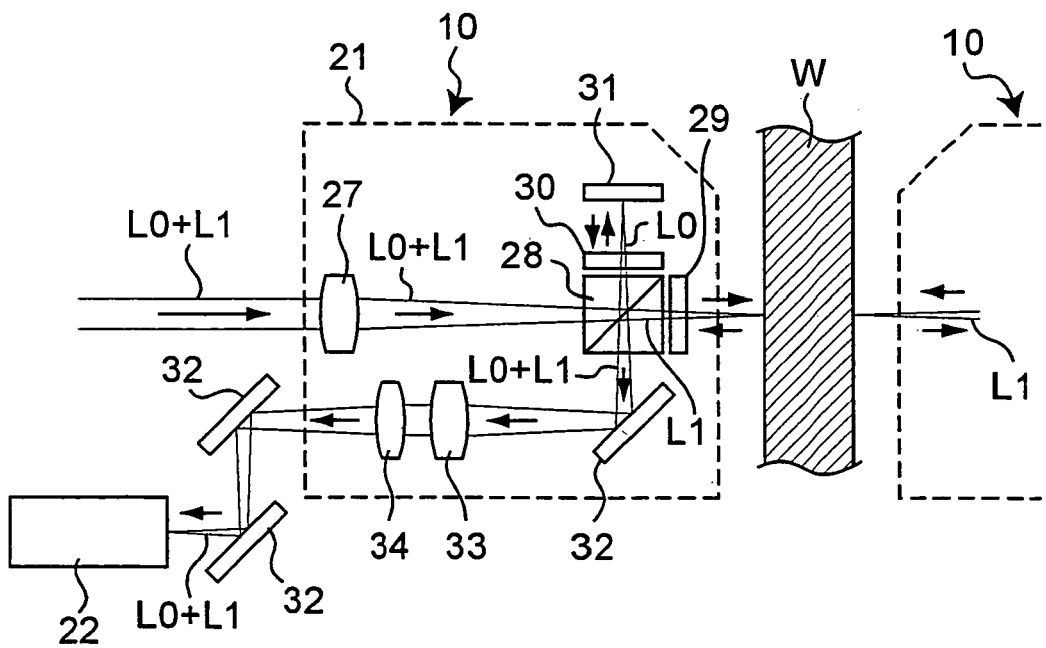
FIG. 4 is a detailed view showing the optical displacement gauge in the embodiment of the present invention.

FIG. 4 is a detailed view of the optical displacement gauge 10 in the embodiment of the present invention.

In FIG. 4, in the measuring optical system 21, the output light beam L0+L1 is focused by a convergence lens 27 and then fed to a polarizing beam splitter 28 serving as a splitting/mixing section. The convergence lens 27 focuses the output light beam L0+L1 so that the measurement light beam L1 is accurately focused and radiated on a surface position of the wafer w. In the polarizing beam splitter 28, the measurement light beam L1 goes straight forward whereas the reference light beam L0 is reflected in a right angle direction, by which both the light beams are split. Such splitting is caused by a difference in the direction of polarization between the measurement light beam L1 and the reference light beam L0 outputted from the laser output unit 23.

After passing a λ/4 wave plate 29, the measurement is light beam L1 travels toward the surface of the wafer W. The measurement light beam L1 is reflected by the wafer W and is again returned to the polarizing beam splitter 28. The reference light beam L0 which passed the polarizing beam splitter 28 passes a λ/4 wave plate 30, and is reflected by a reference mirror 31 and again returned to the polarizing beam splitter 28. A distance from the polarizing beam splitter 28 to the reference mirror 31 is set to be equal to a distance from the polarizing beam splitter 28 to the wafer W.

The reference light beam L0 goes straight through the polarizing beam splitter 28. The measurement light beam L1 is reflected in a right angle direction by the polarizing beam splitter 28 and goes in the same direction as the reference light beam L0. As a result, a mixed light beam L0+L1 of the reference light beam L0 and the measurement light beam L1 is outputted from the polarizing beam splitter 28. However, after being outputted from the polarizing beam splitter 28, travel of the measurement light beam L1 is changed depending on a distance to the wafer W whereas travel of the reference light beam L0 is unchanged, so that travel difference or phase difference is generated between both of the light beams.

The mixed light beam L0+L1 outputted from the polarizing beam splitter 28 is reflected by a plurality of mirrors 32, goes through a collimate lens 33 and a focus lens 34 and is entered into the light receiving section 22. The collimate lens 33 changes the mixed light beam L0+L1 into a parallel light beam. The focus lens 34 converges the mixed light beam L0+L1 onto a light receiving face of the light receiving section 22 and corrects inclination and displacement generated by the reflection of the measurement light beam L1 on the surface of the wafer W so that the light beam is accurately entered into the light receiving face of the light receiving section 22. The light receiving section 22 converts an optical signal to an electric signal, electrically analyzes a wavelength and phase of the reference light beam L0 and the measurement light beam L1, and computes the analyzed data so as to obtain a surface position in the thickness direction of the wafer W or its changes as numerical data. If the reference light beam L0 and the measurement light beam L1 are interfered so as to enlarge or clarify the above-stated travel difference or phase difference and to show them as interference fringes, then it becomes easy to extract displacement information on the wafer W as an electric signal in an optoelectronic transducer.

By performing the above-described measurement while changing measuring places along the surface of the wafer W, fluctuation of the surface position on the wafer W at the place, i.e., displacement, can be obtained. With use of the optical displacement gauges 10, 10 disposed on both sides of the wafer W, displacement of the surface positions of the wafer W is respectively measured. The sum of the displacement of the surface positions of both sides of the wafer W represents thickness fluctuation of the wafer W. It is to be noted that in measurement of the thickness fluctuation, it is not necessary to measure the thickness of the wafer W itself, and a difference or dispersion in thickness of the wafer in a surface direction should be measured as thickness fluctuation. If an interval between the left and right optical displacement gauges 10, 10 is known, then it is possible to identify the thickness of the wafer from positional information on the wafer with respect to both the optical displacement gauges 10, 10.

Further, for measurement and evaluation, sensors for measuring physical properties other than the optical displacement gauge can be used.

(Measuring Operation)

FIG. 5 is a view explaining the measuring operation of the surface displacement performed on the entire surface of the wafer W by the optical displacement gauges 10 in the embodiment of the present invention. The measuring operation is executed by the measuring arithmetic section 101 while operation of a drive portion is controlled by the control unit 102.

In FIG. 5, while the wafer W in the state of standing in a vertical direction is rotated in one circumferential direction around a center B of the wafer W as the center of rotation, the optical displacement gauges 10 are moved on the wafer W from an outer circumference A to the center B in a radial direction for performing measurement of the surface displacement. By such operation, the position of the optical displacement gauges 10 on the wafer W is moved along a spiral line shown as a track S. On the track S, an appropriate interval is provided and the surface displacement of the wafer is measured by the optical displacement gauges 10, which allows efficient measurement of the surface displacement of the entire surface of the wafer.

Further, the optical displacement gauges 10 should be moved linearly in a horizontal direction along the diameter direction 13c only by a distance of the radius A–B by the ball thread 11 serving as the drive section, so that an operating mechanism for the optical displacement gauges 10 can be simplified.

It is to be noted that although the surface displacement of the wafer W may be measured after rotation of the wafer W is started and rotating velocity is stabilized, more effective measurement can be achieved by the method described below.

(Acceleration/Deceleration Process)

FIG. 6A and FIG. 6B are views showing the operations of the wafer W and the optical displacement gauges 10 over time in the embodiment of the present invention. FIG. 6A shows changes in rotating velocity (angular velocity $\omega$) of the wafer W in one measurement cycle time, while FIG. 6B shows changes in linear moving velocity Vx of the optical displacement gauges 10.

In FIG. 6A, when the wafer w retained by the rotor 13 of the hollow spindle 8 is rotated by a motor or the like, it is difficult to achieve a predetermined rotating velocity immediately after start of the rotation due to moments of inertia possessed by the wafer W and the rotating member of hollow spindle 8, and so the rotating velocity $\omega$ is gradually increased from the state of 0, and in a certain period of time, the rotating velocity $\omega$ reaches the predetermined velocity. Also, when the rotation is stopped after the end of measurement, the rotating velocity $\omega$ is gradually decreased, and in a certain period of time, the rotating velocity $\omega$ returns to 0 and the wafer W is stopped.

In a similar manner, in the case of the linear movement of the optical displacement gauges 10, the velocity Vx which is in the state of 0 upon start of the movement is gradually increased as shown in FIG. 6B. At the end of the movement, the velocity Vx is gradually decreased and returned to 0. Consequently, in the case of performing measurement only while the rotating velocity $\omega$ is constant, an acceleration time before the start of measurement and deceleration time after the end of measurement are necessary in addition to a measuring time, which makes a measurement cycle time longer. In the case of performing measurement after the rotating velocity $\omega$ of the wafer w becomes constant, the acceleration time till the rotating velocity $\omega$ of the wafer W reaches a predetermined velocity from the stop state is counted as a non-measurement time, which proportionally elongates the measurement cycle time.

Accordingly, in the embodiment of the present invention, in concurrence with start of the rotation of the wafer W, the linear movement of the optical displacement gauges 10 is started from the outer circumferential position A, and further measurement of displacement by the optical displacement gauges 10, i.e., capture of data, is also started. The rotating velocity of the wafer W and the velocity of the optical displacement gauges 10 are gradually increased.

The rotating velocity of the wafer W and the linear moving velocity or moving position of the optical displacement gauges 10 are detected by sensors 103a, 103b shown in FIG. 12, such as rotary encoders and position sensors, and computed by a computing means such as micro computers included in the control unit 102. Then based on the result, the wafer W and the drive motor of the optical displacement gauges 10 and the like are controlled by the control unit 102 so that the motions of the wafer W and the optical displacement gauges 10 are synchronized, which allows the wafer W and the optical displacement gauges 10 to be moved relatively along the spiral track S shown in FIG. 5, and allows measurement of displacement by the optical displacement gauges 10 to be performed at every predetermined position set on the track S.

As shown in FIG. 6B, the moving velocity Vx is accelerated until the optical displacement gauges 10 reach a location near the middle of the radius A–B from the outer circumference A, and once a predetermined velocity, e.g., Vx=8 mm/sec, is gained, the optical displacement gauges 10 are immediately decelerated and stopped at a center position B.

As shown in FIG. 6A, the rotating velocity ω of the wafer W is accelerated from the start of rotation to a peak time of the moving velocity Vx of the optical displacement gauges 10, and after a maximum velocity, e.g., ω=240 rpm, is gained, the velocity is decelerated from the peak time and the rotation is stopped upon stop of the optical displacement gauges 10.

By performing the above operations, the measuring cycle time can be drastically reduced compared to the method in which measurement is started once the predetermined velocity is attained and deceleration is stopped after the measurement is completed.

(Compensation Processing for Laser Skip in Spiral Measurement)

However, although with a scale serving as a criterion of length in the above-stated optical probe, the optical probe has merit in that measurement can be performed with the use of light wavelengths having high precision determined by physical properties as the criterion, in a case where a measurement face is not a continued face due to the presence of a notch on the measurement face or the like, data skip occurs and it is difficult to compensate the data skip only with signals from the probe.

Accordingly, in the embodiment of the present invention, compensation is performed through the following measuring operation. The measuring operation is executed by the measuring arithmetic section 101 while operation of the drive portion is controlled by the control unit 102. It is to be noted that the detail of the measuring arithmetic section 101 are shown in FIG. 13 and FIG. 14. Further, a portion which executes compensation of the measurement data in the measuring arithmetic section 101 is referred to as a compensating section 104, while a portion which functionally executes laser skip compensation processing for the spiral measurement in the compensating section 104 is referred to as a first skip compensation processing section 101b.

FIG. 7A, FIG. 7B and FIG. 8A, FIG. 8B are views explaining compensation processing for the spiral measurement as shown in FIG. 5 in the embodiment of the present invention.

Upon start of measurement, the optical displacement gauges 10 are moved across from the vicinity of the retaining member of the wafer w where vibration of the wafer w is smaller and linearly moved to the center of the wafer w.

Figure 7A:
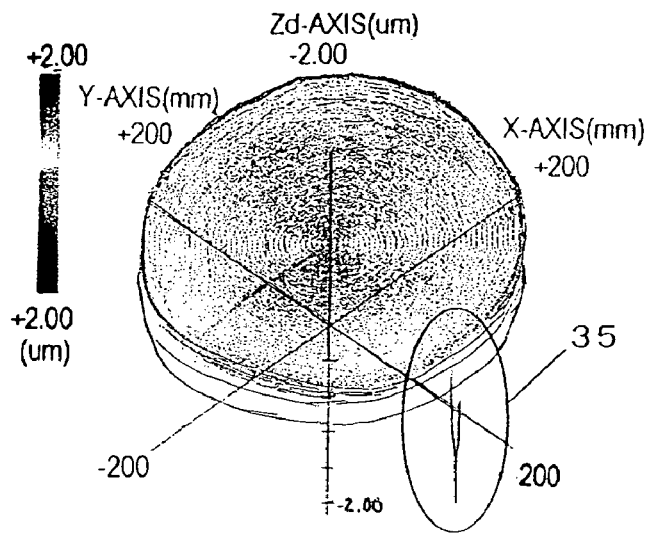
FIG. 7A is an explanatory view showing compensation processing for spiral measurement in the embodiment of the present invention.
Figure 8A:
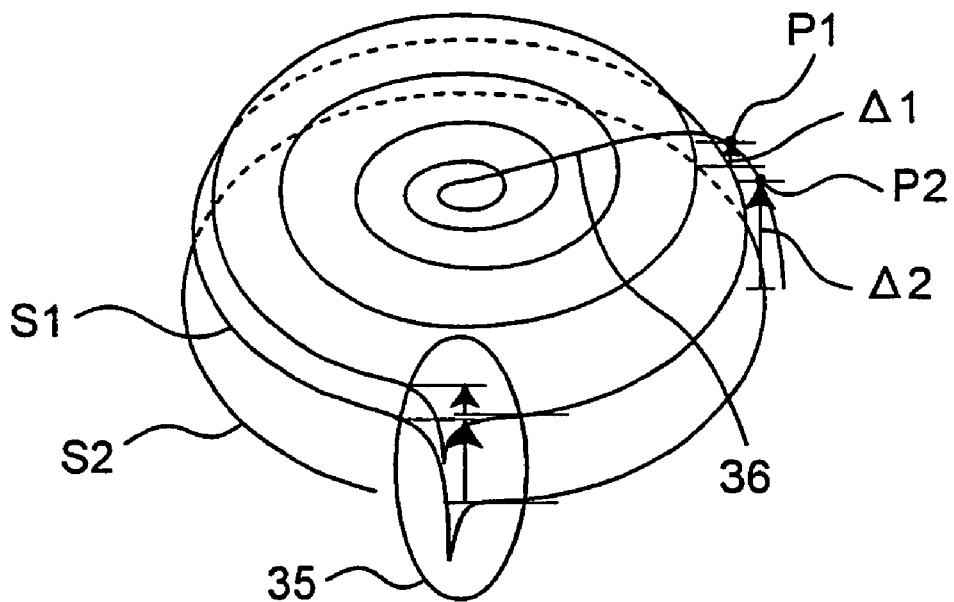
FIG. 8A is an explanatory view showing compensation processing for spiral measurement in the embodiment of the present invention.

FIG. 7A is a view showing axial measurement data measured during movement of the optical displacement gauges 10 from a retreat position outside the wafer to the center of the wafer that is a measurement start point. FIG. 8A is a view showing cross section data, i.e., thickness data on the thin board w. By acquiring the shape data in FIG. 7A and FIG. 8A measured by the optical displacement gauges 10 and storing the data in a storage unit 101a, data on one cross section in the radial direction of a disc-shaped thin board, i.e., thickness data on the thin board w, is acquired.

Next, the above-stated spiral measurement is performed to acquire data on the entire surface of the wafer face, i.e., thickness data regarding the entire surface of the wafer. However, in the vicinity of the notch provided for identifying crystal orientation of the wafer, light used for measurement is not reflected, and therefore continuity of the measurement data is lost, resulting in the occurrence of data skip 35 as shown in FIG. 7A and FIG. 8A.

However, only one laser skip due to the notch occurs in the measurement of one rotation, and measurement in places other than the notch is accurately performed. Accordingly, in the vicinity of a portion around the notch in the spiral measurement, data is divided by every rotation. At intersections between divided data on the entire surface and the data 36 on one cross section in radial direction, a difference of each thickness data of the thin board is obtained. The differences are used as compensation values, and the differences are added to divided data as offset data, thereby making it possible to compensate data skip 35 due to laser skip.

FIG. 8A shows examples of data S1 and S2 in the case where a notch is present in a second round of the measuring route from the outermost circumference. The data skip 35 occurs in the notch portion, and in the portion of a scanning and measuring route after the notch portion, measurement error is generated. At intersections P1 and P2 between the one cross section data 36 and S1, S2 as viewed from the top face of a wafer 35, each of differences Δ1 and Δ2 in thickness direction of the cross section data is calculated. By adding the calculated differences Δ1 and Δ2 as offset data to the shape data regarding each one round of S1 and S2 data, the thickness data of the thin board can be compensated, and correct values can be obtained.

Figure 7B:
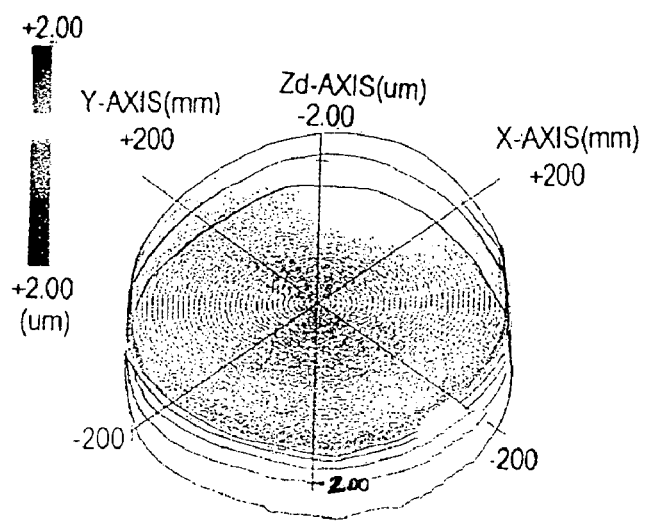
FIG. 7B is an explanatory view showing compensation processing for spiral measurement in the embodiment of the present invention.
Figure 8B:
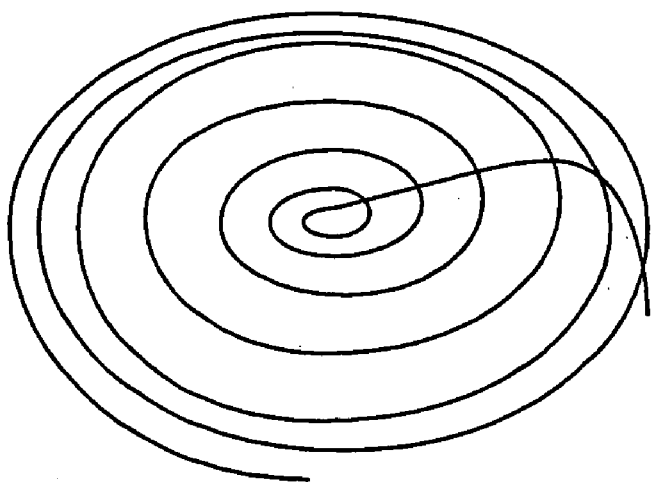
FIG. 8B is an explanatory view showing compensation processing for spiral measurement in the embodiment of the present invention.

FIG. 7B and FIG. 8B are views showing the results of the compensation.

(Laser Skip Compensation Processing for Concentric circles Measurement)

Although in the above embodiment, description has been given of the embodiment in the case of performing measurement in a spiral fashion, the same compensation processing can be performed in the case of performing measurement concentrically. This laser skip compensation processing is also executed by the measuring arithmetic section 101 as with the case of the above-described spiral measurement. Further, a portion which functionally executes laser skip compensation processing for the concentric circles measurement in the compensating section 104 of the measuring arithmetic section 101 is referred to as a second skip compensation processing section 101c.

Description is given of a compensation method in the case of the concentric circles measurement.

Whenever the wafer retained by the rotor 13 rotating in one direction is measured in one rotation, the optical displacement gauges 10 are moved in diameter direction 13c, and upon completion of the movement, the measurement of one rotation is started and 360-degree measurement is performed in the circumferential direction. By repeating this step, the entire surface of the wafer w is measured. In this case, although the rotor 13 should be rotated one or more times to obtain data of one rotation, execution of the laser skip compensation processing makes it possible to avoid driving of the rotor 13 in the forward and reverse directions to avoid measurement of the notch portion, such driving is large in inertia and takes time in acceleration and deceleration, thereby allowing high velocity measurement to be achieved.

Figure 9A:
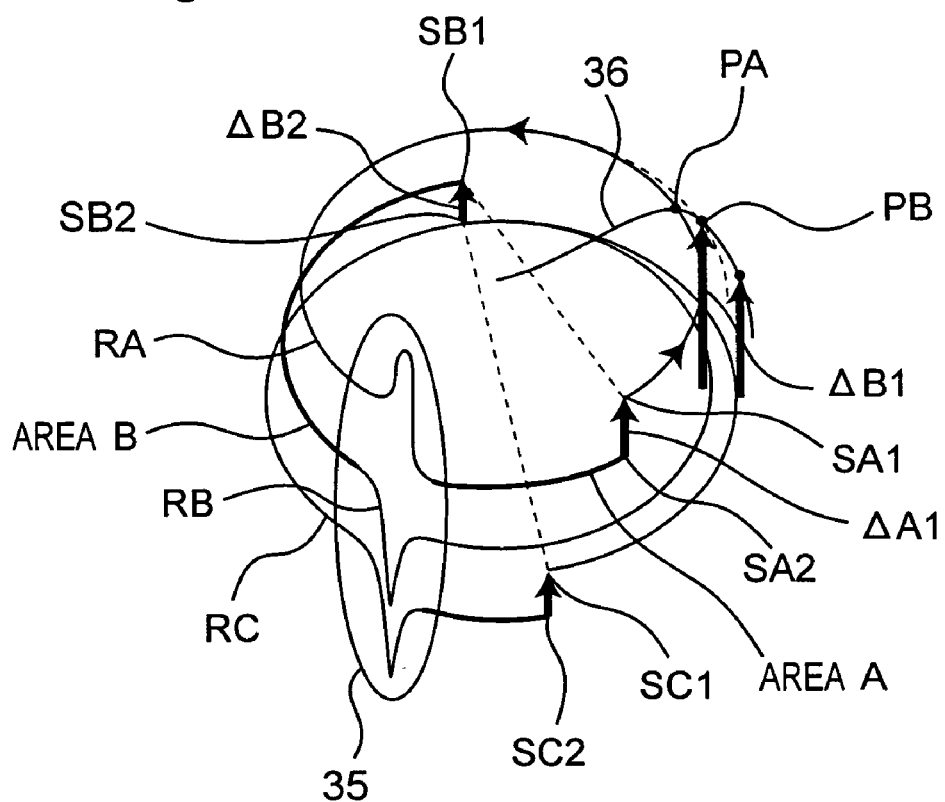
FIG. 9A is an explanatory view showing compensation processing for concentric circles measurement in the embodiment of the present invention.
Figure 9B:
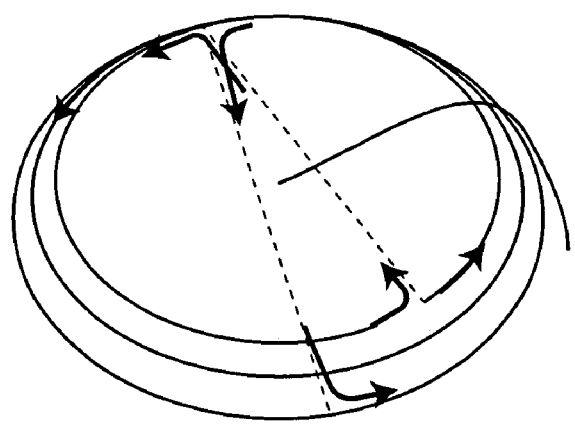
FIG. 9B is an explanatory view showing compensation processing for concentric circles measurement in the embodiment of the present invention.

FIG. 9A and FIG. 9B are views explaining compensation processing of the data skip 35 which occurs when laser light from the optical displacement gauges 10 passes the notch portion in concentric circles measurement.

Upon start of the measurement, the optical displacement gauges 10 are moved across and moved linearly to the center of the wafer w.

FIG. 9A is a view showing one cross section data measured by the optical displacement gauges 10 during movement of the optical displacement gauges 10 from a retreat position outside the wafer w to the center of the wafer w that is a measurement start point. By acquiring the shape data in FIG. 9A measured by the optical displacement gauges 10 and storing the data in the storage unit 101a, data on one cross section in diameter direction 13c of the disc-shaped thin board w is acquired.

Next, concentric circles scanning data regarding radius RA, RB and RC are acquired. In FIG. 9A, measurement of the concentric circles scanning data on the radius RA is started from a measurement start point SA1, and data skip does not yet occur at intersection PA with one cross section data 36. The continuous scanning indicates that the data skip 35 occurs at the notch portion and measurement error is generated in a portion of an area A after the data skip 35.

In the portions other than the area A in the concentric circles scanning data on the radius RA, compensation is not performed as long as a difference between the concentric circles scanning data at the position of PA and the one cross section data 36 in each thickness direction of is within predetermined values.

In the optical displacement gauges 10 shown in FIG. 3 in the embodiment of the present invention, with respect to displacement in the thickness direction of the wafer w, the tone of interference fringes is changed on the light receiving section 22 in a cycle of a half of the wavelength of laser light from the laser output unit 23. In the measurement in the measuring arithmetic section 101, integral multiple values of signals in the cycle of the half of the wavelength of the laser light are counted up, the tone intensity of fringes is electrically converted to measure an accurate position within the half wavelength cycle, and the counted value and the measurement value below the half of the wavelength is added so that the thickness dislocation of the wafer w can be measured with measurement precision below the wavelength.

For example, in the case of a 300 mm wafer, the flatness is completed in a submicron level of accuracy, and since the wafer w is processed by rotation in circumferential direction, a shape difference before and after the notch portion is normally a value smaller than the half of the wavelength of the laser. In the optical displacement gauges 10 of the present invention, occurrence of data skip in the notch portion is attributed to instability of the laser light when the laser light goes out near the notch portion and when the laser light passes the notch portion and reflected light from the surface of the wafer w is again incident to the light receiving section 22. Because of this, noise signals are electrically generated in the light receiving section 22, and the count value for the displacement of integral multiple of the half cycle of the laser wavelength is gone out of a correct one. Further, since the shape of the surface of the wafer w is unchanged, a change value of the shape measured in reality is below the half of the wavelength due to good uniformity of the processing of the surface of the wafer w, and so the value is not of an order which is large enough to change the value for counting the displacement but is of an order which provides slight change to the tone intensity. More specifically, data skip will not occur unless the value is the integral multiple of the half wavelength cycle.

Consequently, a difference ΔA1 between data on the area A portion in FIG. 9A and continuous data on PA side before the occurrence of the data skip 35 is calculated. If the difference ΔA1 is beyond a predetermined value, then a value of the integral multiple of the half of the laser wavelength which is most approximate to the difference ΔA1 is added as a compensation value to the data on the area A portion, by which the data on the area A portion is compensated. It is to be noted that a minimum unit of the compensation value may include a quarter of the laser wavelength in addition to the above-stated half of the laser wavelength.

Upon completion of measurement of the concentric circles scanning data on the radius RA from SA1 to SA2, the optical displacement gauges 10 are moved to a start point SB1 for concentric circles scanning data measurement to start the measurement, and the concentric circles scanning data on the radius RB is measured up to the SB2.

A difference ΔB1 of thickness data of the wafer w at an intersection PB between the concentric circles scanning data on the radius RB and the one cross section data 36 in FIG. 9A is calculated. If the difference ΔB1 is beyond a predetermined value, then it is determined that the data skip 35 occurs at the notch portion. Therefore, a value of an integral multiple of the half of the laser wavelength which is most approximate to the difference ΔB1 is added as a compensation value to data other than the data on the area B portion, by which the data other than the data on the area B portion is compensated.

Further, a difference ΔB2 between data on the area B portion and continuous data on PB side after the occurrence of the data skip 35 is calculated. If the difference ΔA2 is beyond a predetermined value, then a value of an integral multiple of the half of the laser wavelength which is most approximate to the difference ΔB2 is added as a compensation value to the data other than the data on the area B portion, by which the data other than the data on the area B portion is compensated.

After that, the concentric circles scanning data on the radius RC is measured from SC1 to SC2, and the same compensation processing is applied.

FIG. 9B is a view showing the result of the compensation.

By performing the above processing, it becomes possible to measure the entire surface of the wafer w only with one acceleration and deceleration of the rotation of the rotor 13 in one direction without the necessity of paying attention to the notch portion. This makes it possible to implement measurement with high velocity and high precision.

It is to be noted that although in the present embodiment, compensation is performed with the use of the one cross section data 36, it is possible to increase the precision of the compensation by performing the compensation with the use of a plurality of cross section data sets.

Further, although in the embodiment of the present invention, measurement is performed on the concentric circles scanning data on three radiuses including radius PA, RB and RC, the present invention is not limited thereto and the radius number can be changed depending on the accuracy and velocity of the measurement.

(Laser Skip Compensation Caused by Dust and Like)

In the above embodiment, compensation is performed on the data skip 35 at the notch portion. However, in the inner radius side where no notch is present, if dust and like close to a beam radius of the laser light from the probe is present on the wafer w, the signal temporarily vanishes or is weakened, so that continuity of the measurement data is lost and data skip occurs.

Description is now given of a compensation method in the case where data skip occurs due to dust and the like. This laser skip compensation processing is executed in the measuring arithmetic section 101 as with the case of the above-described spiral measurement. Also a portion which functionally executes laser skip compensation processing due to dust and the like in the compensating section 104 of the measuring arithmetic section 101 is referred to as a third skip compensation processing section 101d.

Figure 10:
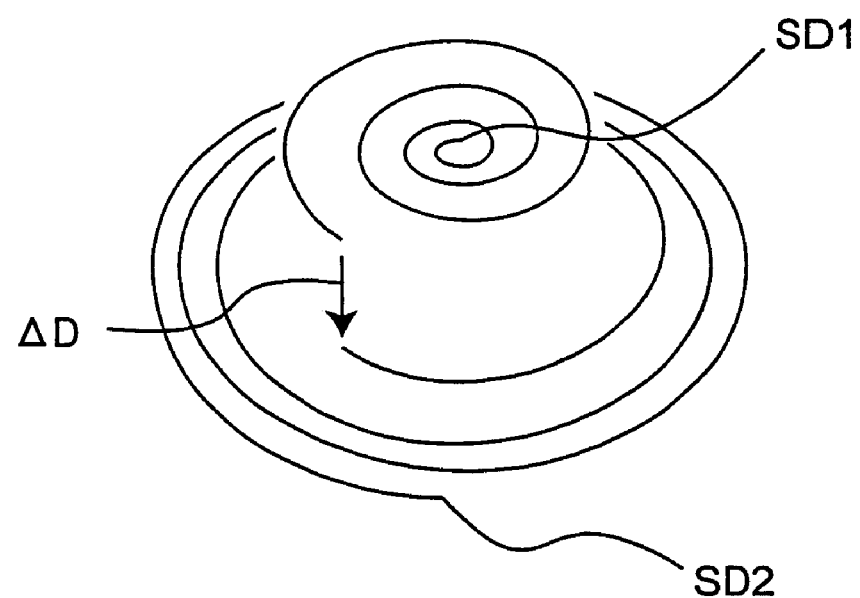
FIG. 10 is an explanatory view showing compensation for data skip due to dust and the like in the embodiment of the present invention.

FIG. 10 is a view showing measurement data when data skip occurs due to dust and the like, where data skip ΔD is caused by dust and the like in the inner radius portion of the measurement.

Detection of the data skip ΔD is performed such that with respect to all the points of measurement data, a difference between previous data and subsequent data is calculated from the start point of the measurement to the end point of the measurement, and if a calculated value is beyond a predetermined value, then it is determined that data skip due to the dust and the like occurs. If it is determined that data skip occurs, then a value of an integral multiple of the half of the laser wavelength, which is most approximate to the data skip ΔD, is added as a compensation value to all the measurement data after the occurrence of ΔD, by which compensation is performed.

By the above processing, it becomes possible to compensate the data skip ΔD due to the dust and the like without measuring one cross section data in advance.

In the above stated measuring method, while the optical displacement gauges are linearly moved in the radial direction of the thin board, the radial direction data of the thin board is measured, and while the optical displacement gauges are moved linearly in the radial direction of the thin board and the thin board is moved in the rotating direction, the surface of the thin board is scanned to measure the surface data. By compensating the surface data with the radial direction data, a cross section value of representative measurement which is measured in advance, i.e., a thickness value of the thin board, is compared with a thickness value of the thin board at the same XY position among all the surface values measured minutely. If the values of the entire surface which were minutely measured are out of alignment, then part of the data on minutely measured portions is compensated by the cross section data, which makes it possible to remove measurement error due to data skip and drift of the measurement data due to temperature or the like even in the case where the notch and the like are measured while the rotor is rotated in one direction for high-velocity measurement.

Further, measuring physical properties of the thin board in concentric circles way makes it possible to measure even positions from the outer circumferential portion of the thin board, thereby allowing more accurate shape measurement compared to the case where in the outer circumferential portion having larger shape changes than the inner radius portion, measurement is performed while a radial position is changed in a spiral fashion up to an outermost circumference.

Further, compared to the measurement with avoidance of the notch, or the measuring operation with loopback measurement, continuous measurement from the center of the thin board to its outer circumferential edge is executable, so that high-velocity measurement can be implemented by reducing driving of the rotor in acceleration and decelera-tion, which driving is large in rotation moment and takes time in acceleration and deceleration. Further, performing compensation with the use of a value in the vicinity of the retaining mechanism of the thin board makes it possible to diminish the influence of vibration on the thin board, thereby allowing high precision measurement.

(Drift Compensation Processing)

Moreover, as another embodiment of the present invention, there is a method for the optical displacement gauges 10 to scan the measurement surface of the wafer w along the X-axis direction and the Y-axis direction in zigzags.

Figure 11:
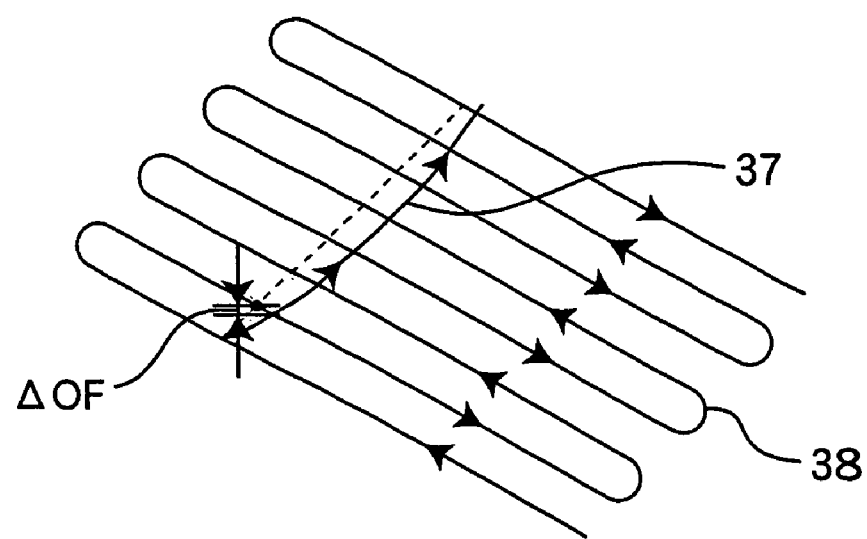
FIG. 11 is an explanatory view showing compensation processing for drift in the embodiment of the present invention.

FIG. 11 is a view explaining compensation processing for compensating measurement error attributed to change of the measuring apparatus itself through zigzag scanning and measuring.

In FIG. 11, a difference ΔOF of data at an intersection between one cross section data 37 which is a measurement of one axial cross section and entire surface scanning data 38 which is a surface measurement is calculated. The calculated ΔOF is added to data on the height direction of the entire surface scanning data 38 for compensation, by which high precision measurement can be achieved.

Further, it becomes possible to reduce measurement error caused by minute particles of dust on the wafer or measurement error caused by drift of temperature or the like, thereby allowing implementation of high precision measurement.

It is to be noted that although in the embodiment of the present invention, compensation is performed with the use of one cross section data, it is possible to increase the precision of the compensation by performing the compensation with use of a plurality of cross section data sets.

Further, although in the described measuring method, the case of using the hollow spindle 8 with the rotor 13 disposed outside the stator 12 as shown in FIG. 1 has been taken as an example, the measuring method is not limited to this case. More particularly, the above-described measuring method is applicable to all the types of measuring apparatuses for rotating a rotated thin board w such as measuring apparatuses with a rotor disposed inside a stator.

The measuring apparatus and method for a thin board in the present invention can be applied to the use of flatness measurement for a thin board such as semiconductor silicon wafers, which is required to suppress generation of wind which causes vibration of the thin board, to have a structure to minimize exposure of a rotating portion, and to perform high precision measurement even with the presence of a notch, dust and the like on the thin board.

It is to be noted that, by properly combining the arbitrary embodiments of the aforementioned various embodiments, the effects possessed by them can be produced.

The entire disclosure of Japanese Patent Application No. 2003-370411 filed on Oct. 30, 2003, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A measuring apparatus for a thin board, the apparatus comprising:
    a fixed stator;

a rotor configured to rotate in a state of being disposed outside the stator;

a retaining mechanism configured to retail the thin board on the rotor; and a measuring section configured to measure physical properties of the thin board, wherein the measuring section is disposed on both sides in a thickness direction of the thin board.

2. The measuring apparatus for a thin board as defined in claim 1, wherein the thin board is vertically retained by the retaining mechanism.

3. The measuring apparatus for a thin board as defined in claim 1, wherein the measuring section is an optical displacement gauge comprising: an optical output section for generating output light; a splitting/mixing section for splitting the outputted light into measurement light and reference light used as a reference, radiating the split measurement light onto a surface of the thin board, and coupling resultant reflection light reflected on the surface and the reference light; and a light-receiving section for receiving coupled light which is coupled in the splitting/mixing section and calculating a shape of the surface of the thin board.

4. A measuring method for a thin board, the method comprising:

retaining the thin board with a retaining mechanism disposed on a rotor, wherein the rotor is disposed outside a stator; and measuring physical properties of the thin board while rotating the retained thin board by rotation of the rotor, wherein a thickness and a shape are measured from both sides in a thickness direction of the thin board.

5. The measuring method for a thin board as defined in claim 4, wherein the physical properties of the thin board are measured by comprising: splitting outputted light into measurement light and reference light; radiating the split measurement light onto a surface of the thin board; coupling resultant reflection light reflected on the surface of the thin board and the reference light; receiving the coupled light by the coupling; and calculating a shape of the surface of the thin board.

* * * * *

UNITED STATES PATENT AND TRADEMARK OFFICE
CERTIFICATE OF CORRECTION

| | | |
|---|---|---|
| PATENT NO. | : 7,178,393 B2 | |
| APPLICATION NO. | : 10/973349 | |
| DATED | : February 20, 2007 | |
| INVENTOR(S) | : Keishi Kubo et al. | |

It is certified that error appears in the above-identified patent and that said Letters Patent is hereby corrected as shown below:

IN THE CLAIMS

In column 17, line 3, please change "to retail the" to --to retain the--.

Signed and Sealed this

Twenty-second Day of May, 2007

JON W. DUDAS
*Director of the United States Patent and Trademark Office*